US006279309B1

(12) United States Patent
Lawlor et al.

(10) Patent No.: US 6,279,309 B1
(45) Date of Patent: Aug. 28, 2001

(54) MODULAR MULTI-PART RAIL MOUNTED ENGINE ASSEMBLY

(75) Inventors: Shawn P. Lawlor, Redmond; Kenneth H. Hicks, II, Tacoma, both of WA (US)

(73) Assignee: Ramgen Power Systems, Inc., Bellevue, WA (US)

( * ) Notice: Subject to any disclaimer, the term of this patent is extended or adjusted under 35 U.S.C. 154(b) by 0 days.

(21) Appl. No.: 09/376,157

(22) Filed: Aug. 17, 1999

Related U.S. Application Data

(60) Provisional application No. 60/101,931, filed on Sep. 24, 1998.

(51) Int. Cl.[7] .................................................. F02C 3/14
(52) U.S. Cl. ....................... 60/39.02; 60/39.31; 60/39.35
(58) Field of Search ............................ 60/39.02, 39.31, 60/39.34, 39.35, 270.1

(56) References Cited

U.S. PATENT DOCUMENTS

| 2,930,492 | | 3/1960 | Metcalf . | |
| 3,208,217 | * | 9/1965 | Sonder | 60/39.31 |
| 3,556,672 | * | 1/1971 | Gentile | 60/39.31 |
| 3,837,164 | * | 9/1974 | Carr | 60/39.31 |
| 4,044,442 | | 8/1977 | Carlson . | |
| 4,635,336 | | 1/1987 | Ades et al. . | |
| 5,473,883 | * | 12/1995 | Naudet | 60/39.31 |
| 5,709,076 | * | 1/1998 | Lawlor | 60/39.35 |

FOREIGN PATENT DOCUMENTS

| 24 26 231 | 12/1975 | (DE) . |
| A1 0 395 826 | 11/1990 | (EP) . |

OTHER PUBLICATIONS

Thomson Industries, Inc., Roundway Linear Guide Web page design information files. HTTP://www.thomsonind.com Date:Unknown.

* cited by examiner

*Primary Examiner*—Ted Kim
(74) *Attorney, Agent, or Firm*—R. Reams Goodloe, Jr.

(57) ABSTRACT

A modular power plant apparatus, and method of power plant assembly. An inlet air module is provided on feet which are mounted on self centering rugged linear roller guides which are linearly displaceable along a track. When the fuel-air mixing module is retracted along the roller track, the main engine housing is pivoted on an engine stand, to position the output shaft upward. An exhaust bearing plate is removable from the main rotor housing, to allow the rotating element to be removed. When exposed, hot section elements can be inspected, repaired, and replaced.

44 Claims, 19 Drawing Sheets

MODULAR MULTI-PART RAIL MOUNTED ENGINE ASSEMBLY

This application claims the benefit of U.S. Provisional Application No.: 60/101,931 filed Sep. 24, 1998.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

1. Technical Field of the Invention

Our invention relates to an apparatus and method for constructing, inspecting, and servicing the rotating elements of rotary engines. More particularly, this invention relates to a novel combination of structures useful for assembly and for the inspection, repair, and replacement of hot section elements in shaft mounted rotary engines.

2. Background of the Invention

Demand for a low cost, simply built, and inexpensive to maintain thermal power plant continues to build. This urgent need has been further increased by the relatively recent deregulation of the electrical power supply market in many jurisdictions. Importantly, the prime mover in electrical generation plants is the key to providing low cost power. Thus, many electrical and/or mechanical power plants could substantially benefit from a prime mover that offers a significant improvement over currently practiced cycle efficiencies in power generation. Moreover, such prime movers could benefit substantially from an improved design and assembly structure which allows faster, quicker, and easier methods for assembly, inspection, and repair.

Power plant designs which are now commonly utilized in co-generation applications include (a) gas turbines, driven by the combustion of natural gas, fuel oil, or other fuels, which capture the thermal and kinetic energy from the combustion gases, (b) steam turbines, driven by the steam which is generated in boilers from the combustion of coal, fuel oil, natural gas, solid waste, or other fuels, and (c) large scale reciprocating engines, usually diesel cycle and typically fired with fuel oils. Of the currently available power plant technologies, diesel fueled reciprocating and advanced aeroderivative turbine engines have the highest efficiency levels. Since gas turbines perform more reliably than reciprocating engines, they are employed with increasing and widespread frequency.

In any event, particularly in view of reduced governmental regulation in the sale of electrical power, it can be appreciated that significant cost reduction in electrical power generation would be desirable. Fundamentally, given long term fuel costs, this objective can be most effectively accomplished by generating electrical power at higher overall cycle efficiency than is currently known or practiced. In order to accomplish such an objective, it is also an important and related objective to provide an engine which is simple to build, and which is easy to inspect, and in which the "hot elements" are easy to repair as and when it becomes necessary. Such improvements would enable such an engine to remain on-line for a higher percentage of the time, thus increasing the engine's availability for power generation, and thereby increasing revenue for the power company.

SUMMARY OF THE INVENTION

We have now invented a novel modular design and engine equipment structure which simplifies the assembly, disassembly, inspection, and repair of a rotary type power plant, and in particular, for a ramjet based rotary power plant. Our invention uses the novel combination of a linear rail mounted fuel/air mixing section and an axially displaceable rotating element, which element includes a rotor, shaft, and related "hot section" equipment. In ramjet type power plants, such "hot section" equipment may include rim segments, thrust segments, and related strakes, seals, and tab locks. By disengaging the fuel/air mixing section from the engine, and by removal of the exhaust duct assembly, the ramjet engine casing (with the rotating element including the just mentioned component) can be turned on pivot mounts, to allow removal of the inlet bearing plate and associated components. Then, the rotor and the hot section components affixed thereto are available for inspection, and may easily and quickly removed for inspection, repair, or replacement. With respect to ease of assembly, and with respect to ease of inspection, our modular type rotary ramjet power plant has significant operating and maintenance advantages, when compared to those heretofore used power plants of which we are aware.

Importantly, the design of our linear rail mount fuel/air mixing section, as incorporated into a unique ramjet power plant design, overcomes some of the significant and serious problems which have plagued earlier attempts at the use of supersonic ramjets for efficient electrical power production.

First, the important aerodynamic design of the fuel/air mixing section is not compromised, yet the rotating element is easily exposed and/or removed for inspection of the "hot section" elements. This is important commercially because it enables a power plant to reduce operating and maintenance expenses, and reduces the "down-time" necessary to inspect rotating components. It is easy to understand that decreasing the "cycle time" for inspection and repair of the "hot section" components of the rotating element can have an important and revenue enhancing effect, as such improvements can dramatically improve overall plant availability.

Second, the use of a modular assembly method minimizes the overall time required (and thus the cost involved) to initially assemble a ramjet powered rotary engine. Therefore, our design reduces initial construction costs.

Third, our modular engine structure and the method of employing the same for engine assembly, inspection, and repair, represents a considerable improvement over the conventional designs, such as the horizontal split-case designs often employed in the manufacture of gas turbine and steam turbine equipment. In one important aspect, this is because our apparatus enables the power plant operator to reduce the use of overhead crane lifting equipment, as some of the key heavy components are rail mounted, and are relocatable by hand, in spite of their considerable weight.

In short, in order to reduce costs in power plant installation, operation, and maintenance, we have now developed a novel modular engine configuration which overcomes some specific problems inherent in the heretofore known apparatus and methods that are known to us and which have been heretofore proposed for the application of gas turbine technology or ramjet technology to stationary power generation equipment. Of primary importance, we have now developed the combination of modular components wherein at least one module is displaceably mounted on roller guides which ride on a track. Heavy duty opposing curved rollers are used to carry one or more modules on each of preferably at least two solid linear rails. In our design, the fuel-air mixing module of the ramjet engine is mounted on a plurality of linear roller feet, and more preferably, the fuel-air mixing module is mounted on at least four such roller feet. Each of such feet preferably utilizes a dual type linear roller bearing, wherein a pair of curved roller bearing tracks are mounted in stable, partially opposing, self centering fashion.

Ideally, the fuel-air mixing module has a casing that is provided with an interior stationary housing with a first wall surface and an exterior stationary housing with a second wall surface that are disposed substantially concentrically along a longitudinal axis, to define between the first wall surface and the second wall surface an annular inlet air plenum. Extending substantially radially between the first wall surface of the interior stationary plenum, and the second wall surface of the exterior stationary plenum, are a number of smooth, preferably airfoil shaped stators. In one embodiment, a fan is provided a pre-selected distance upstream of the airfoils, to supply air into the inlet air plenum. The blades of the fan are disposed to move air from upstream of the fan toward the airfoil shaped stators, and then on through the gap between the interior stationary plenum and the exterior stationary plenum.

The rotating element which may be exposed and inspected in accord with the teaching herein includes a high strength rotor. In one embodiment, the rotor comprises a steel hub with a plurality of high strength rim segments and a plurality of ramjet thrust segments. Preferably, each of the ramjet thrust segments and rim segments are detachably and replaceably affixed to the rotor. At least one, and preferably two or more ramjet engines are provided on the rotor via use of a plurality of ramjet thrust segments. The ramjet engines are situated so as to engage and to compress that portion of the airstream which is impinged by the ramjet upon its rotation about the aforementioned axis of rotation.

Fuel is added to the air before compression in the ramjet inlet. The fuel may be conveniently provided through use of fuel supply passageways located in airfoil shaped stators of the axial inlet air fan, which are located radially in an annular ring. Fuel injection passageways are provided communicating between the fuel supply passageways and the inlet air passageway. Fuel injected into the inlet air stream is thus well mixed with the inlet air, by use of vortex generators located on the inlet stators. Combustion of well mixed fuel occurs in the rotary ramjet combustor and against the main rotor housing. The hot combustion gases formed by oxidation of the fuel escape rearwardly from the ramjet nozzle, thrusting the ramjet tangentially about the axis of rotation, i.e., rotate the rotor and associated output shaft. The power generated by the turning output shaft portions may be used directly in mechanical form, or may be used to drive an electrical generator and thus generate electricity.

Importantly, when inspection is required, access to the rotating assembly may be had, once the necessary instrumentation, fuel, air, hydraulics, water, and other lines are temporarily removed, by undertaking the following key steps:

(a) removing the inlet air plenum (if one is used);

(b) rolling the fuel-air mixing module away from the main rotor housing;

(c) disconnecting the output rotor shaft by removing the output coupling;

(d) removing the exhaust gas plenum;

(e) pivoting the main rotor housing to place the outlet bearing plate in an upward orientation, i.e., exhaust side upward;

(f) removing the outlet side bearing housing;

(g) removing the outlet side bearing plate.

It is to be understood that many variations in the modular apparatus and the method of assembling and inspecting the rotating element of a rotary engine may be provided within the general teachings of our invention. Finally, in addition to the foregoing, our novel modular power plant apparatus is simple, durable, and relatively inexpensive to manufacture, and the method of assembly and inspection is most advantageous in the provision of an easily maintainable power plant.

OBJECTS, ADVANTAGES, AND FEATURES OF THE INVENTION

From the foregoing, it will be apparent to the reader that one important and primary object of the present invention resides in the provision of novel, linear rail mounted engine modules which provide cost effective assembly, inspection, and repair of the rotating element, including the hot section components, of a ramjet powered engine utilized for generating mechanical and electrical power.

More specifically, an important object of the invention is to provide a simple, reliable, and safe method to relocate large, heavy engine components.

Other important but more specific objects of the invention reside in the provision of a modular, relocatable inlet air module for a rotating assembly, and particularly for a rotating ramjet engine, which:

is simple to assemble and to disassemble;

in conjunction with the preceding object, provides an apparatus and method which reduces the time required for assembly, disassembly, inspection, and repair of the rotating assembly elements in a power plant;

allows the assembly of the power plant to be done in an easy, quick manner;

minimizes the complexity of inspection procedures;

allows increased availability of a ramjet engine, compared to more complex housing and time consuming assembly techniques used for other types of power plants.

One key feature of the present invention is the use of a rugged linear roller guide for positioning of the relocatable fuel-air mixing module. In this design, a pair of sturdy, opposingly mounted, self-aligning curved rollers running on a cylindrical stationary race assure adequate load bearing capacity for the heavy fuel-air mixing module. The adaption of such linear roller guides to an engine assembly enables a large mass to be relocated with minimal force and effort.

Finally, another important feature of the present invention is the ability to easily inspect hot section components in the rotating assembly, including, in particular, the rim segments, thrust segments, strakes, and related seals and tab locks. This elegant design feature assures that all hot section components can be simply inspected, removed, repaired, or replaced as necessary, with minimum down-time for the engine.

Other important objects, features, and additional advantages of our invention will become apparent to those skilled in the art from the foregoing and from the detailed description which follows and the appended claims, in conjunction with the accompanying drawing.

BRIEF DESCRIPTION OF THE DRAWING

FIG. 2 shows the relationship of FIGS. 2A and 2B.

FIG. 13 shows the outlet bearing housing with the external labyrinth seal (a) removed vertically, and (b) split apart for extraction from the unit.

FIG. 14 shows the outlet bearing housing with a pair of lifting plates being affixed to a first portion of the outlet bearing housing and to a second portion of the outlet bearing housing, so that the first and second outlet bearing housing portions may be lifted.

FIG. 15 shows the first and second outlet bearing housing portions being removed from the outlet bearing plate.

FIG. 16 shows the first and second outlet bearing housing portions being laterally spread apart, where lifting means may be utilized to remove the outlet bearing housing portions.

DETAILED DESCRIPTION

Figure 1:
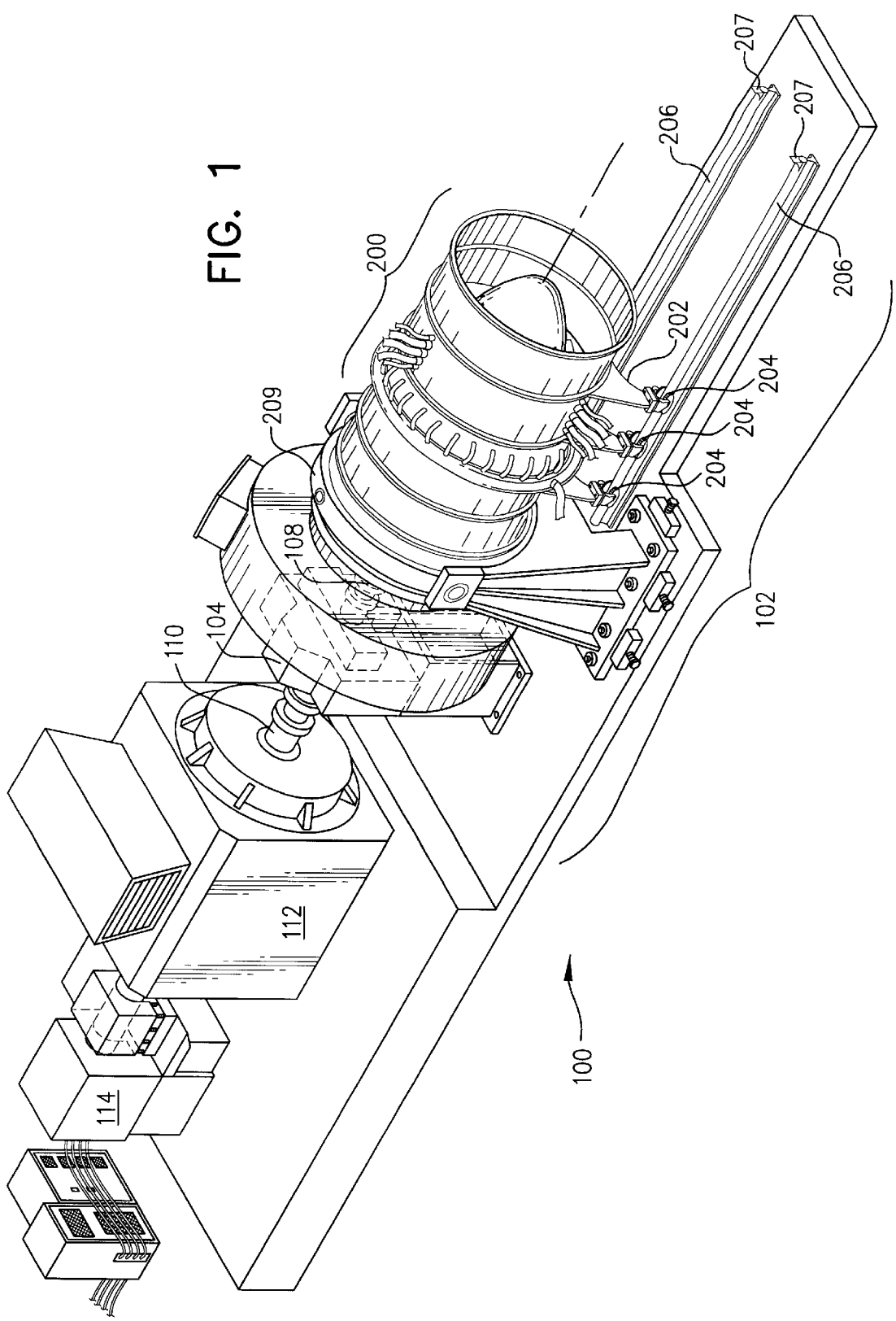
FIG. 1 provides a perspective view of a novel ramjet power plant apparatus, showing our modular, rail mount for moving the fuel-air mixing module, and more broadly showing (a) the relocatable fuel-air mixing module with liner roller guide feet for horizontal displacement along rails (b) the main rotor and rotor housing module, held in an operating position by a tripod engine mount, (c) the exhaust module, including the gas exit plenum, (d) a gearbox (e) an electrical generator, and (f) a starter motor.

First, a brief overview of the ramjet engine technology to which the present invention is applied is appropriate. Referring now to the drawing, FIG. 1 depicts a partial cut-away perspective view of a novel rotary ramjet driven power plant 100. Major components shown in this FIG. 1 include the rotary ramjet engine assembly 102 and gear set 104. The ramjet engine assembly 102 has a driven output shaft 108, which is operationally coupled with gear set 104 for power transfer therethrough. Gear set 104 has power output shaft 110, which is coupled with and rotates at a desired rate of rotation to drive an electrical generator 112. The entire ramjet engine rotating element can be started via use of startup motor 114, situated at the rear 113 of generator 112.

Figure 2A:
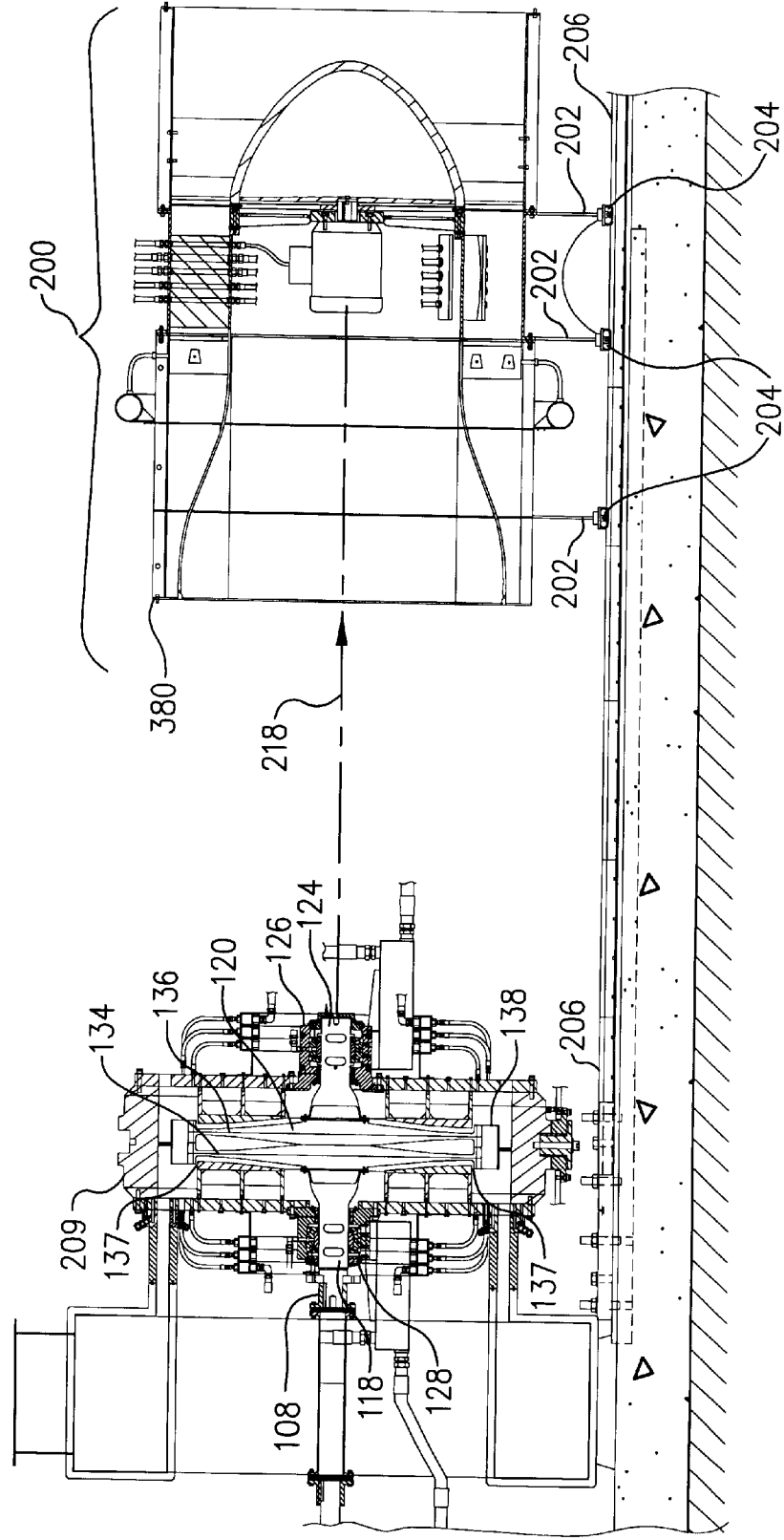
FIG. 2A is a vertical cross-sectional view taken along the centerline of the longitudinal axis of the plant.
Figure 2B:
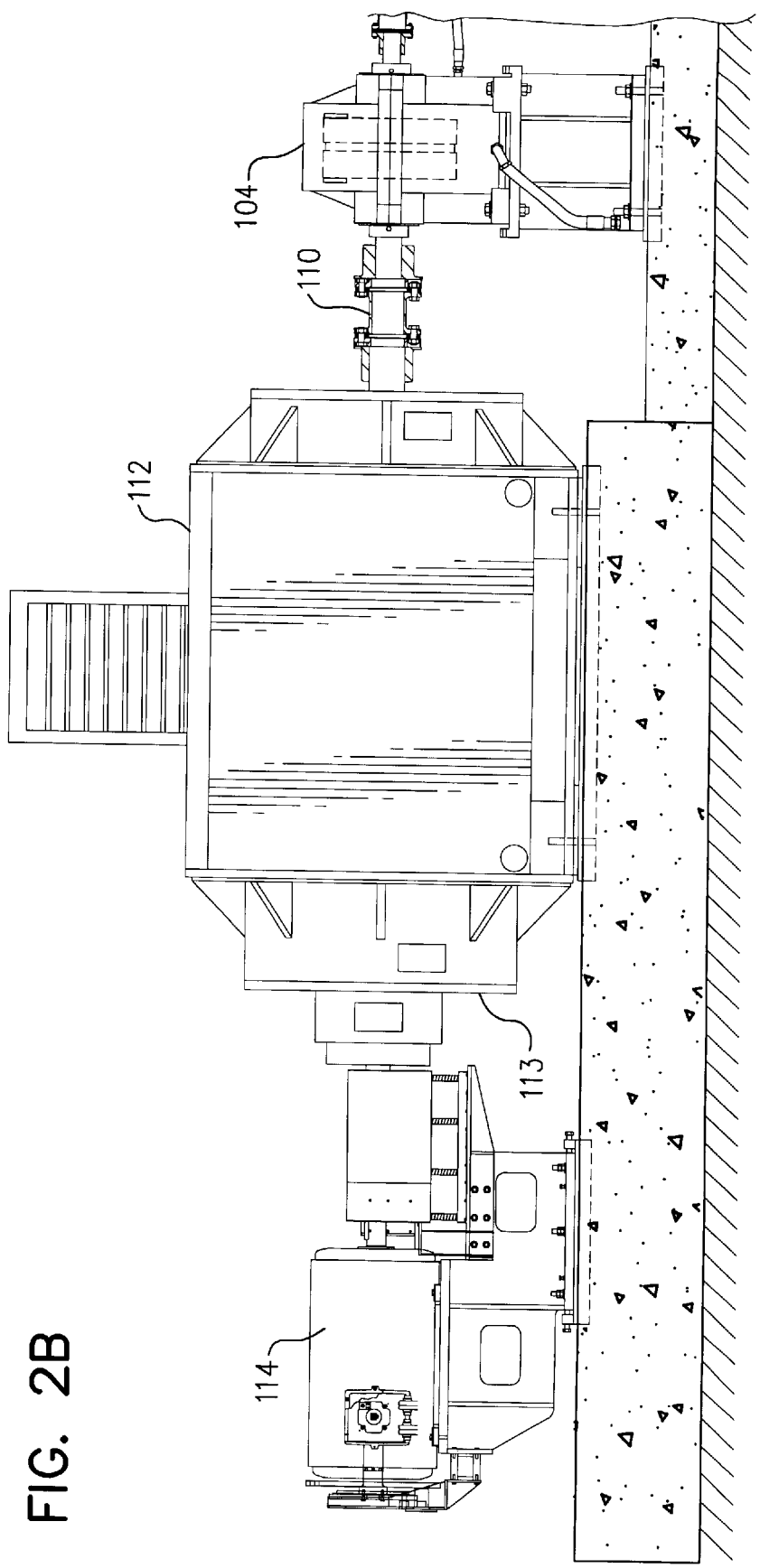
FIG. 2B is a side elevation view, continuing the view of the equipment started in FIG. 2A, now showing in side elevation details of some of the ramjet power plant apparatus described in FIG. 1 above, namely the power output shaft, gearbox, an electrical generator, and starter motor.

The overall structure of a rotary ramjet engine assembly 102 can be better appreciated in FIG. 2, made up of sub-parts, namely FIGS. 2A and 2B. A high strength rotor 120 has shaft portions 118 and 124. The shaft portions 124 and 118 turn in inlet and outlet bearing housing assemblies 126 and 128, respectively. In this FIG. 2A, one embodiment 120 of our high strength rotor design and related components is shown, illustrating rotor construction using a pair of tapered disc rotor elements 134 and 136. As indicted in FIG. 8, at the radial distal edge 137 of rotor elements 134 and 136 are interlockingly and detachably releasably secured a plurality of radially extending ventilatable rim segments 138 in a series of rim segments from $138_1$ through $138_x$. As provided, in addition to the detachable rim segments 138, one or more thrust segments are provided, using detachably affixable ramjet thrust segments 142, each in a series of detachably affixable ramjet rim portions $142_1$ through $142_x$ to provide a relevant portion of the applicable ramjet structure. The basic requirements for ramjet engine technology is taught by earlier patents and patent applications of Shawn P.

Lawlor, including: (1) U.S. Pat. No. 5,372,005; (2) U.S. Pat. No. 5,709,076; (3) U.S. patent application Ser. No. 08/213,217 (filed Mar. 3, 1994); and (4) U.S. patent application Ser. No. 09/149,728, filed Sep. 8, 1998. For details see the disclosures of each of such patents or applications, the full disclosures of each of which are incorporated herein by this reference.

Figure 6:
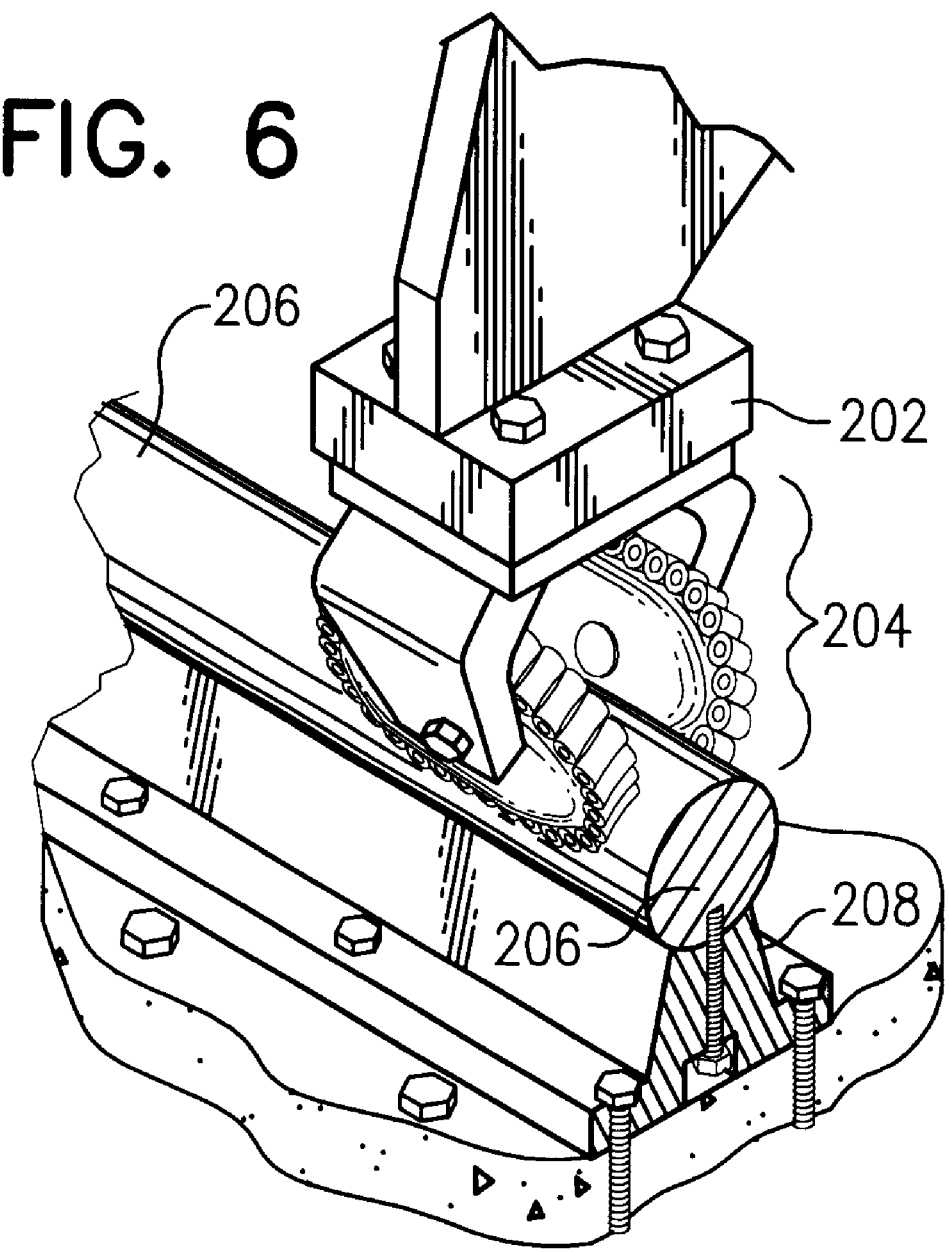
FIG. 6 is a detail of a mounting foot on the fuel-air mixing module, showing use of shock resistant opposing linear roller guides with curved rollers which roll on a solid cylindrical race.

Also shown in FIG. 2A is the relocatable fuel-air mixing module 200, with legs 202 riding on opposing, dual type linear roller guide feet 204. As indicated in FIG. 6, the feet 204 preferably ride on a cylindrical shaft linear race type track 206. At the distal end of the track 206, end stops 207 are provided, to retain the fuel-air mixing module on the track 206. Track 206 may be mounted on any convenient horizontal support structure or mounting block, such as spaced apart dual support rails 208, as shown in FIGS. 1 and 6. One source for such roller guide feet is Thomson Industries, Inc., who provides design resources for detailed engineering of their roller bearing linear roller guides at their web site, located at http://www.thomsonind.com.

Figure 3A:
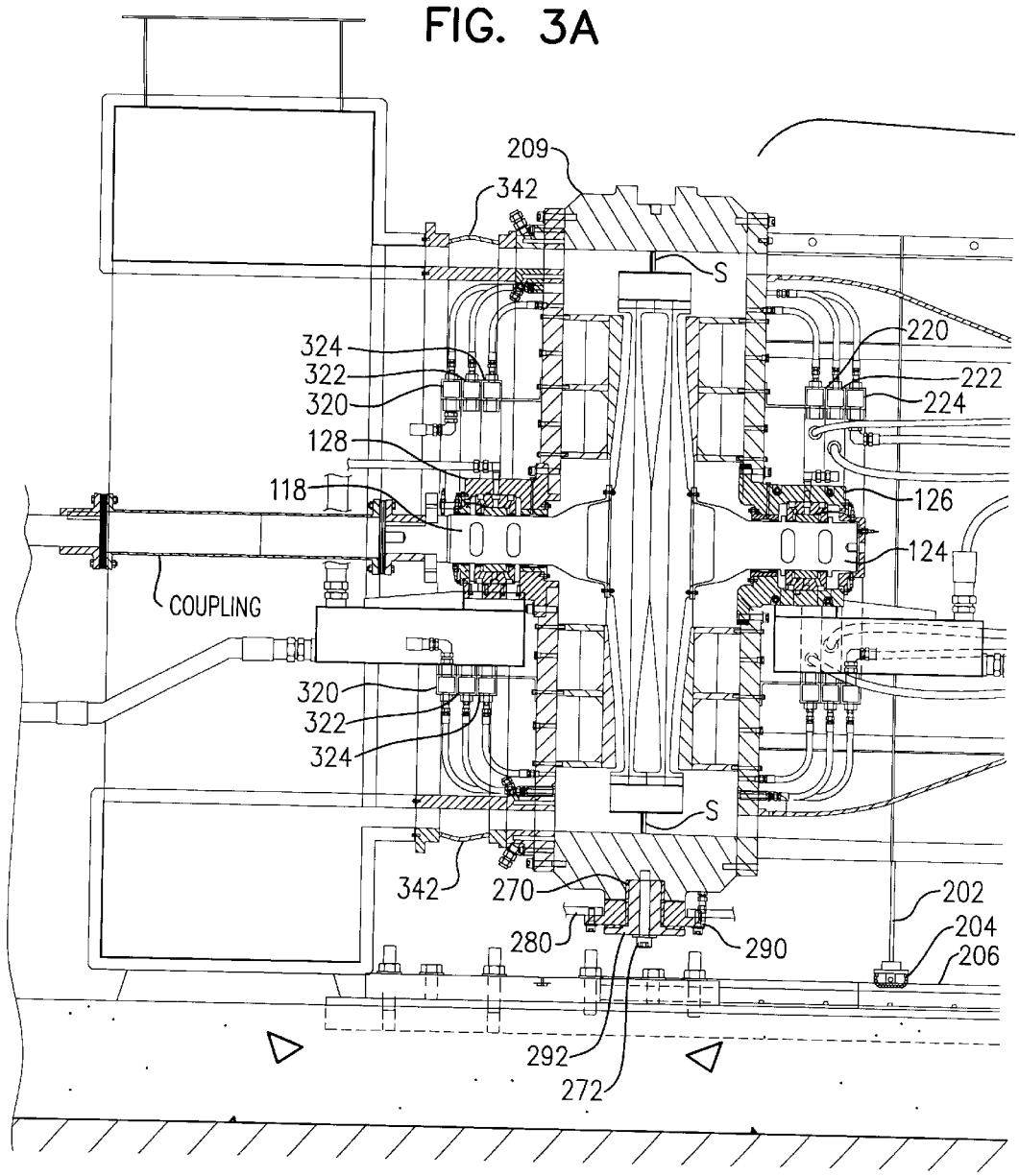
FIG. 3A is a detailed vertical cross-sectional view of the main rotor housing, the main rotor, inlet bearing plate, outlet bearing plate, inlet and outlet bearing housings, and related water, oil, air, gas, and other utility connections.
Figure 3B:
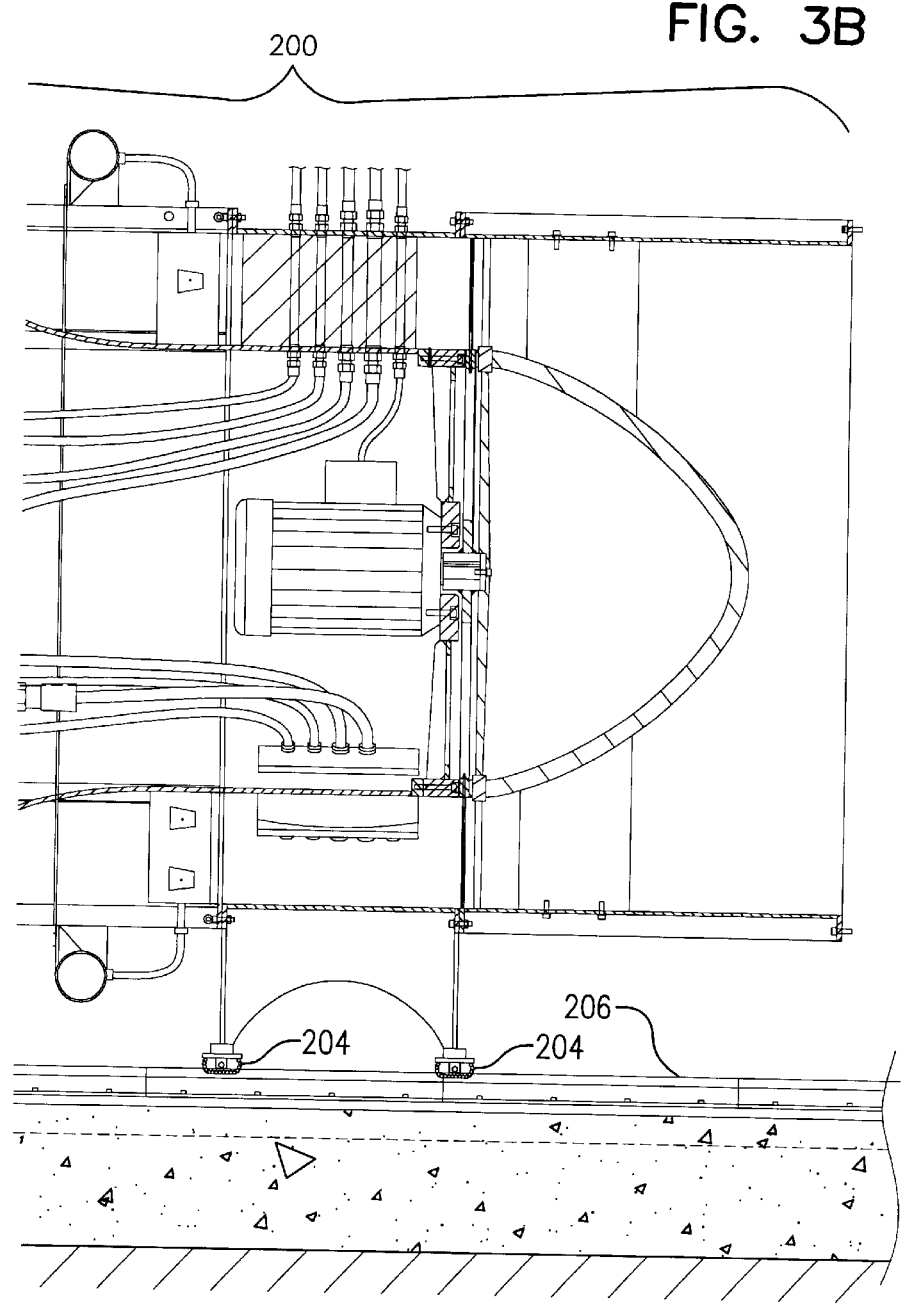
FIG. 3B is a detailed vertical cross-sectional view of the inlet to the fuel-air mixing module.
Figure 3:
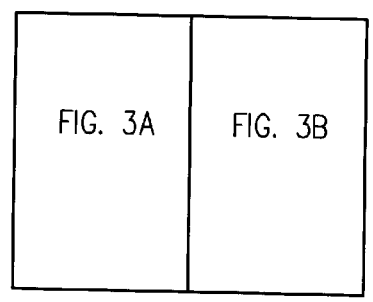
FIG. 3 shows the relationship of FIGS. 3A and 3B.
Figure 7:
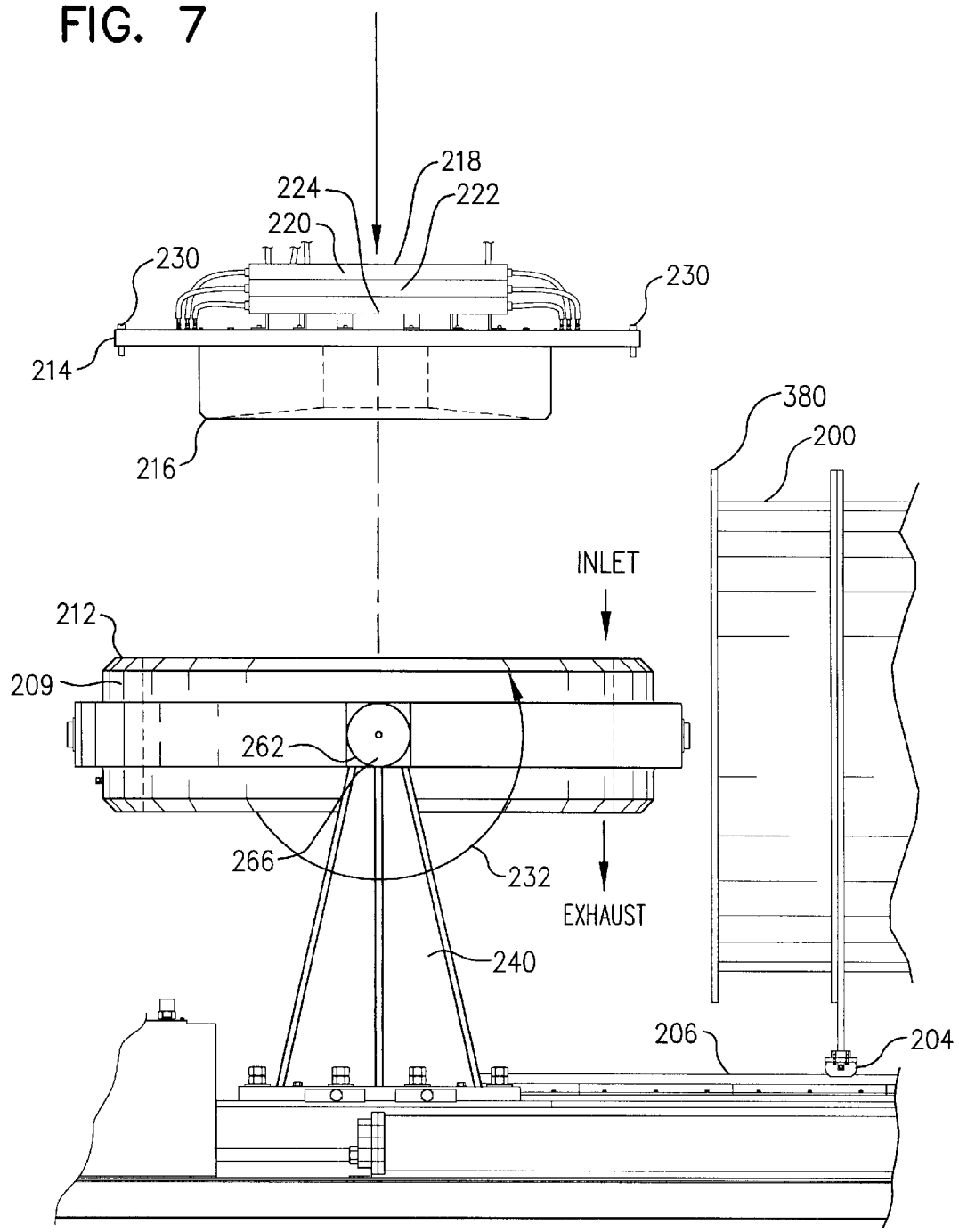
FIG. 7 is a side view of the first step in a preferred method of engine assembly showing the main rotor housing pivoted into a horizontal position, wherein the intake bearing plate, close fitting rotor housing, and accompanying utility header for vacuum, fuel inlet, and compressed air.

As illustrated in FIG. 2A, the fuel-air mixing module 200 is situated in an initial assembly position, awaiting the assembly and positioning the main rotor housing 209 into an operating position, as indicated in FIGS. 1 and 3A. However, the steps necessary to assemble the ramjet engine 102 can be better appreciated by reference to FIG. 5 and FIGS. 7–13. In FIG. 7, the main rotor housing 209 is shown in a first horizontal position with the main rotor housing intake side 212 in an upward position, showing the step of lowering the intake bearing plate 214, the intake side close fitting perforated rotor housing 216, and the utility header assembly 218 with supply conduits for vacuum 220, for secondary fuel 222 (normally natural gas), and for compressed air supply 224. The intake header assembly 218 is preferably provided in the form of stacked ringlike or circular tubes, preferably circular tubes in a stackable square cross-section (when examined radially) as can be seen in FIGS. 2A and 3A.

We prefer to use fasteners such as bolts 230 to secure intake bearing plate 214 to the intake side 212 of the main rotor housing 209. After the intake side bearing plate 214 has been affixed to the main rotor housing 209, then the main rotor housing 209 is pivoted 180 degrees, as suggested by reference arrow 232 in FIG. 7, so that the main rotor housing 209 is then ready for further assembly, as shown and discussed in connection with FIG. 8 below.

Figure 5:
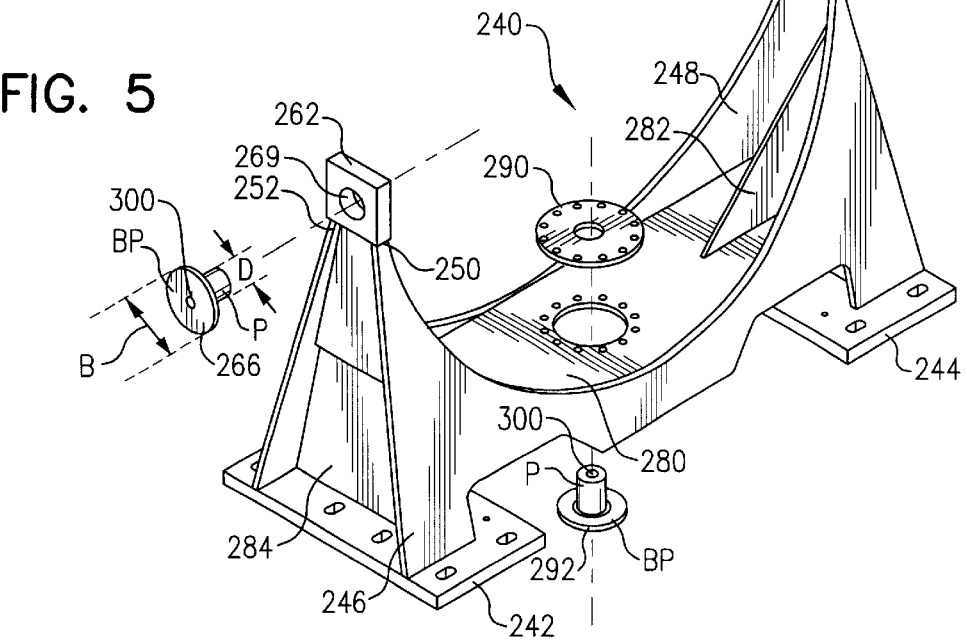
FIG. 5 is a perspective view of the main engine stand, showing the opposing pivot points, pivot pins, and bottom alignment block and alignment pin.

Pivotal support during assembly and secure support during operation is provided for the main rotor housing 209 by the engine stand 240, details of which are illustrated in FIG. 5. First 242 and second 244 feet are provided to support the U-shaped engine stand 240. The first 242 and second 244 feet support generally U-shaped (transverse to the longitudinal axis of the engine), upwardly and inwardly inclined inlet side support plate 246 and exhaust side support plate 248. At the outer, distal ends 250 of inlet side support plate, and at the outer, distal ends 252 of outlet side support plate, horizontally opposing pivot blocks 260 and 262 are securely mounted. First 264 and second 266 pivot pins are provided for close interfitting passage through passageways 268 and 269 in opposing pivot blocks 260 and 262, respectively, and for secure engagement with pivot pin receiving recesses 270 in the main rotor housing 209. (See FIG. 3A for typical structure for pivot pin receiving recesses, and for threaded fasteners 272 used to secure pivot pins to the main rotor housing 209). A bottom plate 280 is provided to stabilize engine stand 240, and stiffeners 282 are utilized as necessary to support against wedge shaped endpieces 284. Conventional welded construction is normally preferred for construction of engine stand 240. Affixed to the bottom plate is an alignment block 290 for use in securing an alignment pin 292 to the bottom 294 of the main rotor housing 209, as partially seen in FIG. 3A., although the engine stand 240 has been largely deleted in this figure for clarity of presentation of engine internal components. We prefer to utilize pivot pins 264 and 266, as well as alignment pins 292, which have a cylindrical pin portion P of a first diameter D and a thin disc shaped backing plate BP of diameter B. Also, the cylindrical pin portion P, as well as the backing plate portion, each have a centrally located aperture A along their cylindrical axis, of sufficient diameter to accept therethrough in firm interfitting fashion the earlier mentioned threaded fasteners 272.

The apparatus and method used for securing the main rotor housing is very important. The rotor 120 is rotatably secured in an operating position in a manner suitable for extremely high speed operation of the rotor 120, such as rotation rates in the range of up to about 8,900 rpm, or even 10,000 to 20,000 rpm, or higher. In this regard, inlet side bearing 126 and outlet side bearing 128, or suitable variations thereof, must provide adequate bearing support for high speed rotation and thrust, with minimum friction.

Figure 8:
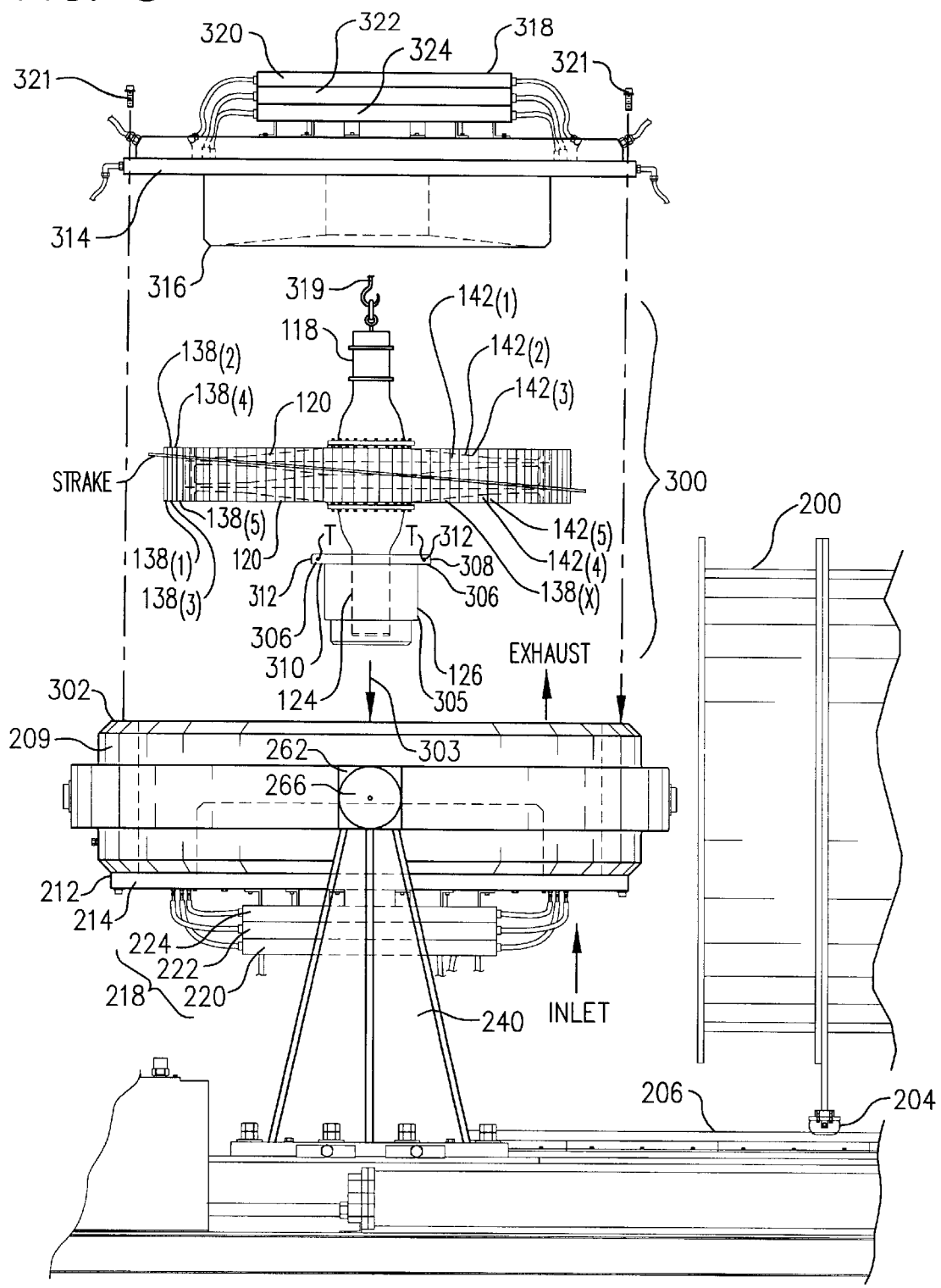
FIG. 8 is a side view of a second step in a method of engine assembly, showing main rotor housing having been pivoted 180 degrees from FIG. 7, and now showing the installation of the rotating assembly, and the installation of the exhaust side bearing plate, close fitting rotor housing, and accompanying utility header for vacuum, a cooling water outlet, and compressed air.

Turning now to FIG. 8, the next step in the method of assembly is illustrated, first showing the addition of the main rotating assembly 300. The high strength rotor 120 (shown in broken lines) has shaft portions, namely output shaft portion 118 and inlet shaft 124. The output shaft portion 118 turns in the outlet bearing housing assembly 128 (see FIG. 9).

As shown in this FIG. 8, the outlet or exhaust side 302 of the main rotor housing 209 is facing upward. Inlet bearing housing 126 is lowered (see reference arrow 303) to a recessed inlet bearing receiving flange 304 in intake bearing plate 214 (see FIG. 17). The side 305 of inlet bearing housing 126 extends downward through the preferably circular opening 307 at the center of intake bearing plate 214. The face 306 of inlet bearing flange 308 is positioned against the recessed inlet bearing receiving flange 304. Fasteners such as bolts 309 extend through apertures 310 in inlet bearing receiving flange 304 and cooperate with threads T in receiving apertures 312 in inlet bearing flange 308.

Figure 15:
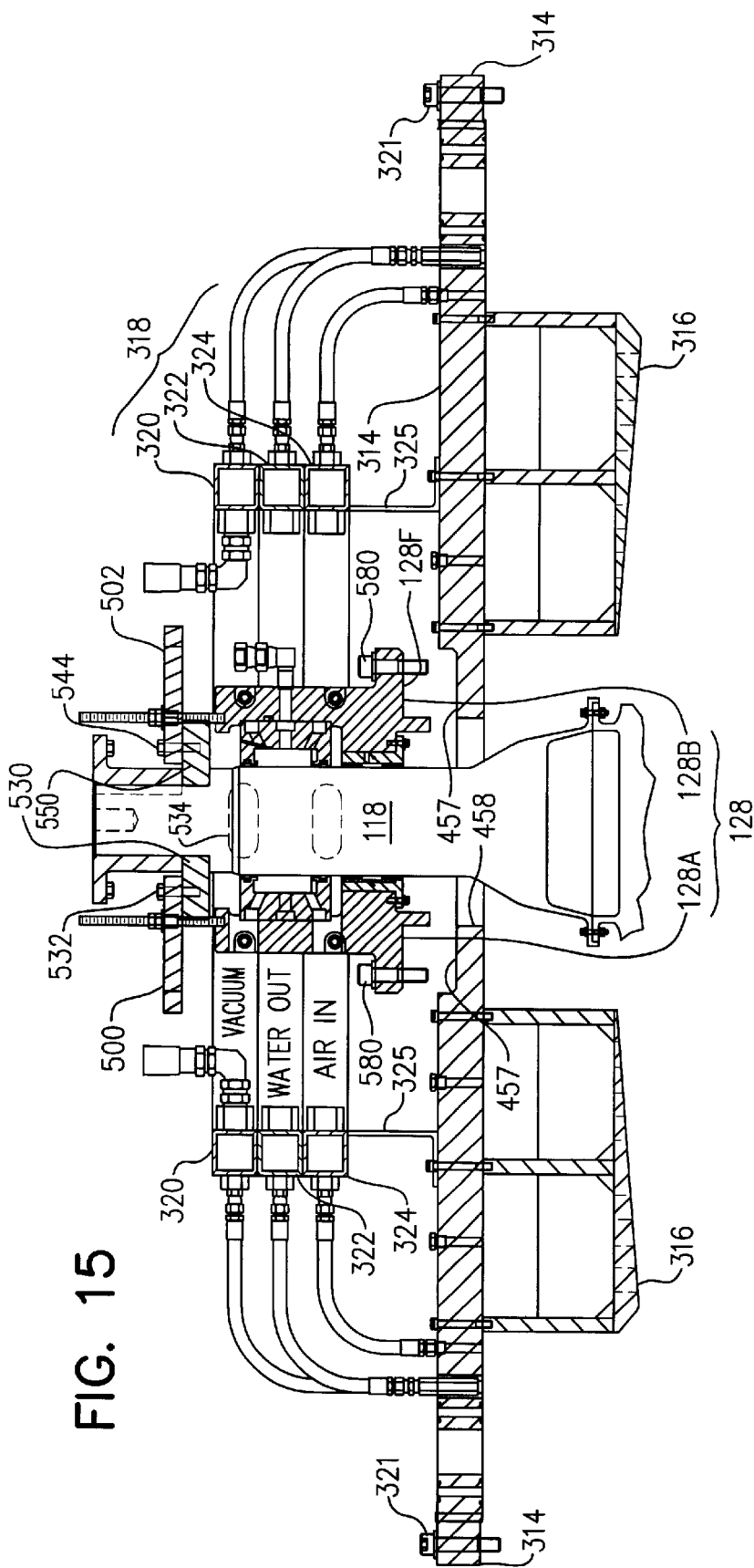

Next, the outlet side bearing plate 314, the outlet side close fitting perforated housing 316, and the accompanying outlet side utility header 318 are shown suspended in position above the main rotor housing 209, where it is ordinarily supported by lifting means such as crane hook 319. The outlet side bearing plate 314 is then lowered into an operating position and secured via fasteners 321. The outlet side utility header 318 provides conduits for vacuum 320, a cooling water outlet 322, and air inlet inlet 324. Conduits 320, 322, and 324 are preferably provided in stacked, circular tubular rings, most preferably in square shaped cross section (see FIG. 15, for example) and are welded together into a single header assembly 318. Mounting feet, preferably L-shaped brackets 325, secure header 318 to outlet side bearing plate 314.

After the outlet bearing plate 314 is installed, the outlet bearing housing assembly 128 must be installed, by lowering the bearing housing assembly 128 down to the outlet bearing plate 314, on which the outlet bearing housing flanges 128F rest, and then securing the outlet bearing flanges 128F via fasteners through holes in the flanges 128F. This is illustrated in hidden lines in FIG. 9.

Figure 4:
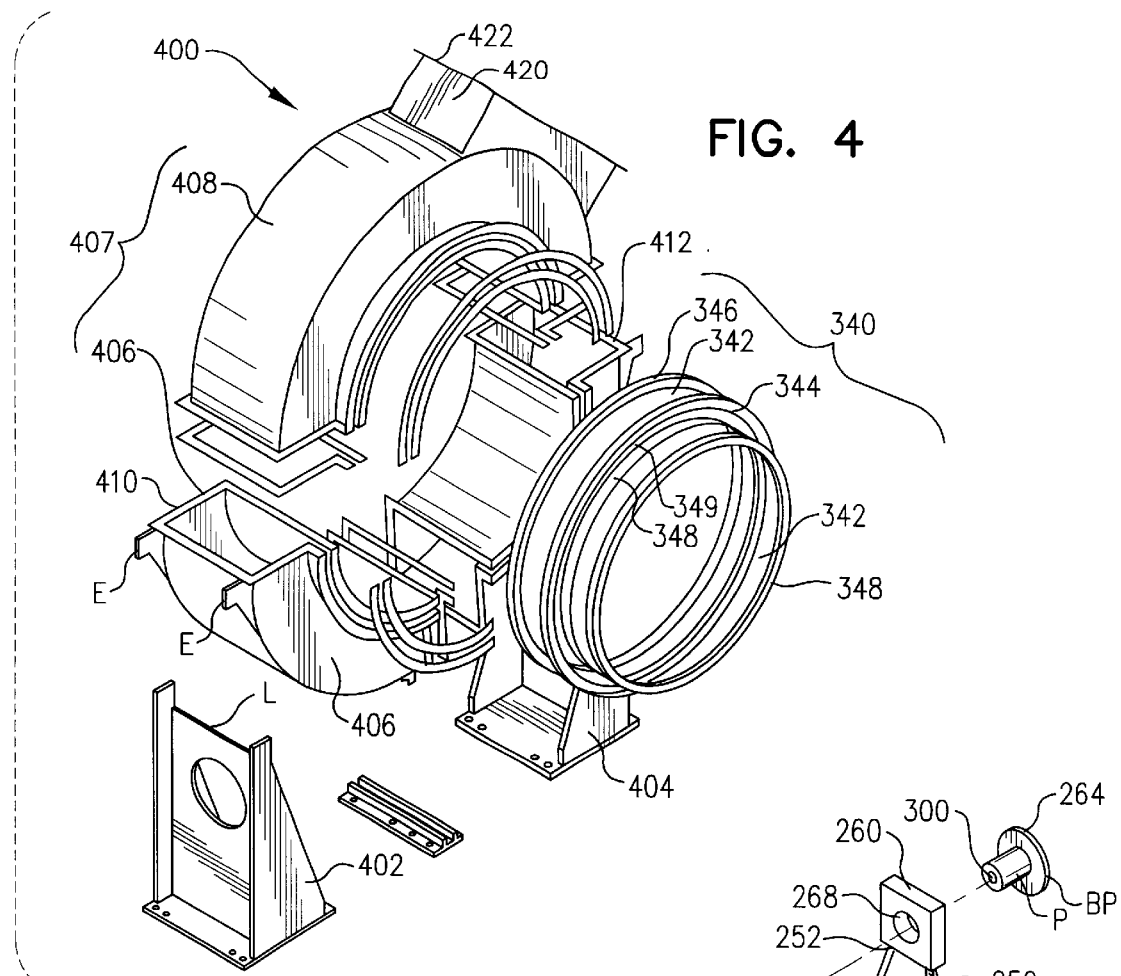
FIG. 4 a perspective view of the exhaust gas collection assembly, showing the upper and lower exhaust duct portions, an expansion joint assembly which is placed between the main rotor housing exhaust gas outlet and the exhaust gas collection assembly, a pair of exhaust duct stands for supporting the exhaust gas duct portions, an alignment fixture, and an exhaust duct slider.
Figure 9:
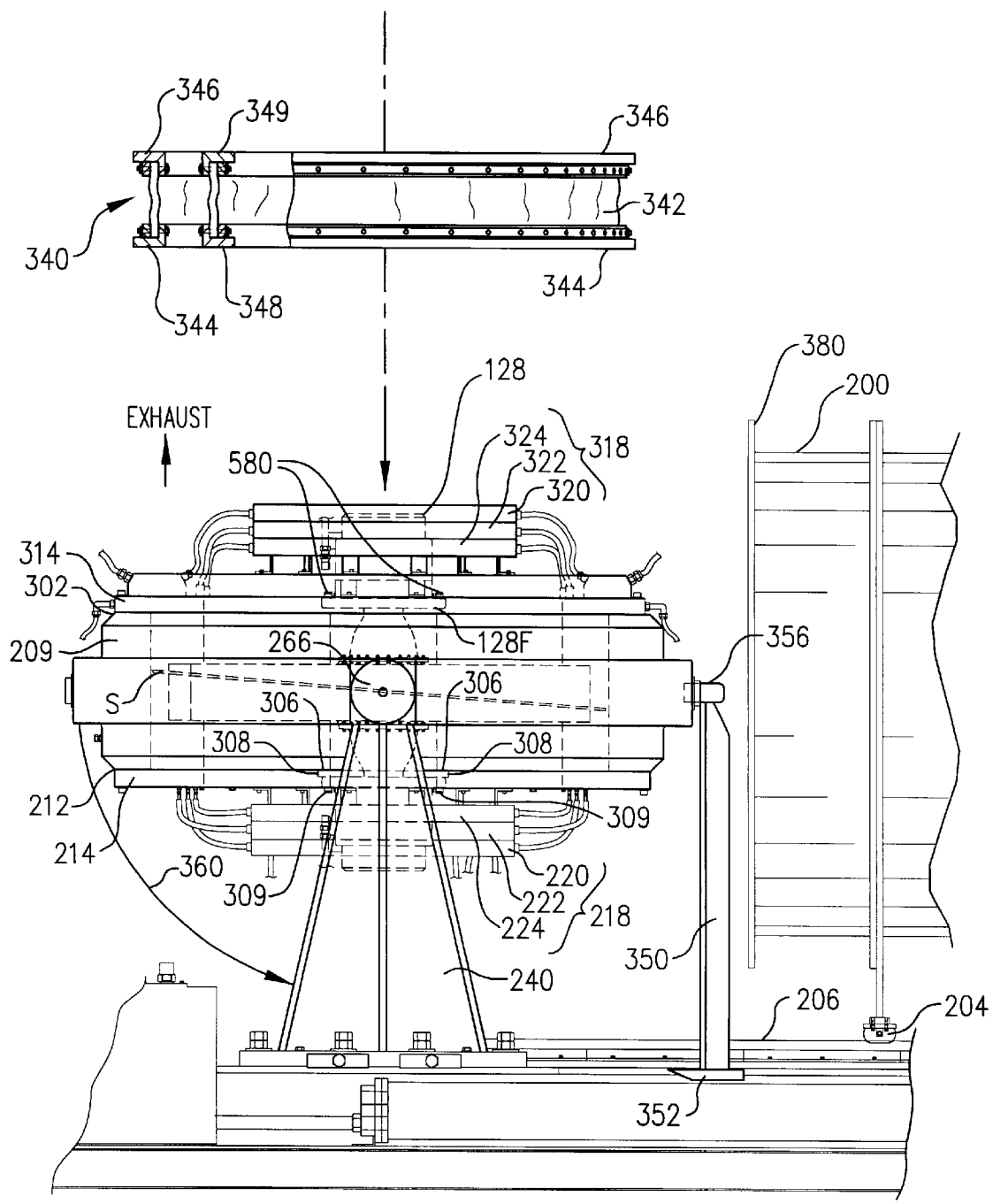
FIG. 9 is a side view of a third step in a method of engine assembly, showing the main rotor housing with both inlet and outlet bearing plates affixed, with the exhaust expansion duct being affixed to the exhaust or outlet bearing plate side, and with turning arrows showing the rotation of the main rotor housing 90 degrees so that the main rotor housing is vertically disposed.
Figure 10:
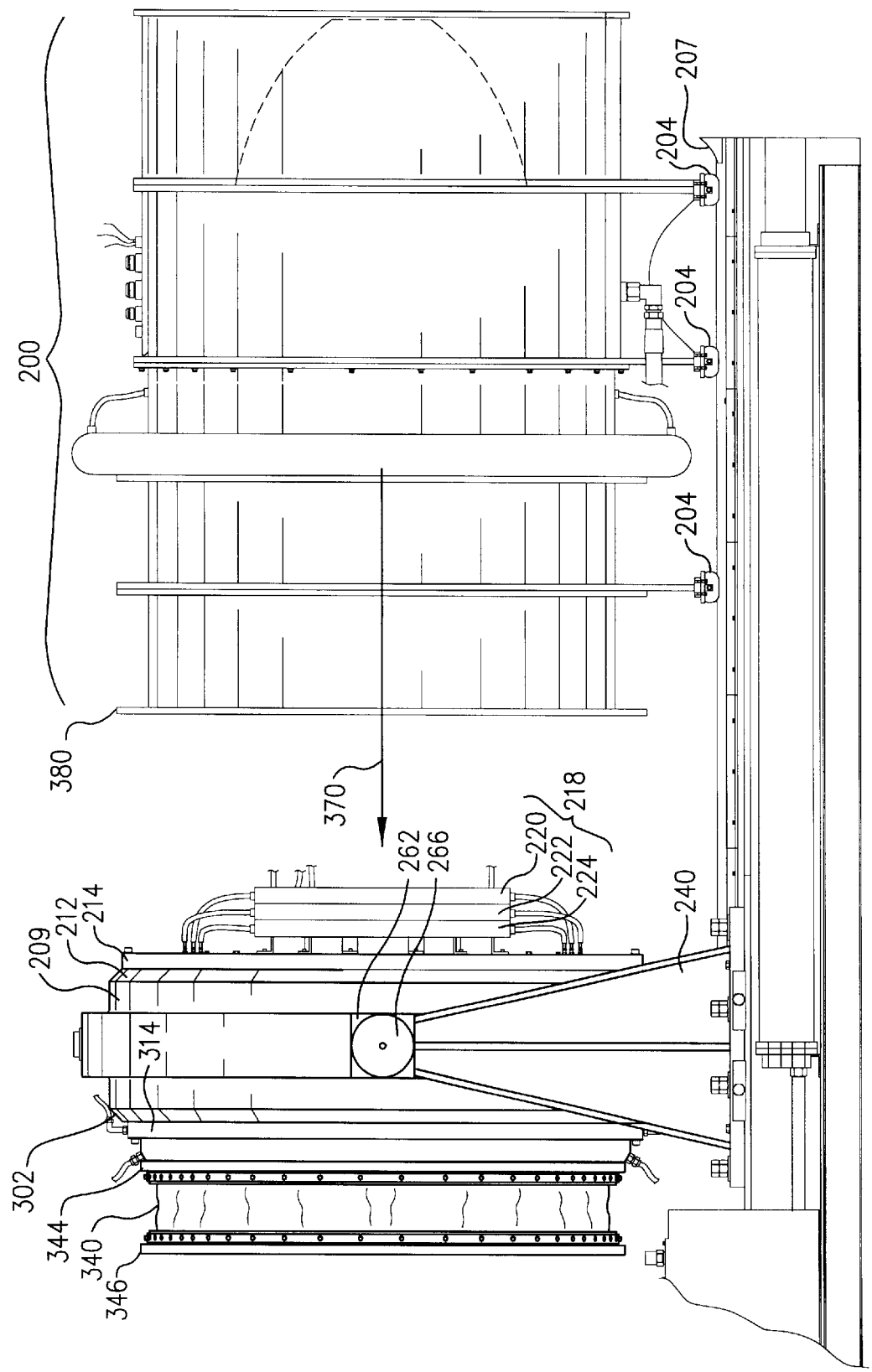
FIG. 10 is a side view of a fourth step in a method of engine assembly, showing the fuel-air premix module being horizontally moved toward the inlet side of the main rotor housing, so that it the two modules can be joined for operation.

FIG. 9 also shows a side view of a further step in a method of engine assembly, showing the main rotor housing with both inlet 214 and outlet 314 bearing plates affixed, with main rotor housing 209 still turned as shown in FIG. 8, so that the exhaust side 302 of main rotor housing 209 is still upward. Then, the exhaust gas expansion joint duct 340 is affixed to the exhaust exhaust or outlet side 302 of the main rotor housing 209. The exhaust gas expansion joint duct 340 is an annular, ringlike short tubular enclosure, with an outer flexible material 342 suitable for high temperature operation in direct contact with exhaust gas, secured between mounting inlet 344 and outlet 346 mounting flanges. This annular shape is further evident by examination of the details shown in FIG. 4, where the inner flexible material 342 is shown, and where the inner inlet flange 346 and inner outlet flange 348 are depicted.

During assembly or disassembly operations when it is desired to secure the main rotor housing 209 in a horizontal position, a mounting stand 350 is utilized. The mounting stand 350 has a foot 352 for placement on the foundation adjacent to the engine stand 240, and a locking pin 356 for insertion into one of the external pivot connections or pivot pin receiving locations 270 in the annular shaped main rotor housing 209.

After the exhaust gas expansion duct 340 is mounted to the exhaust side 302 of the main rotor housing 209, the main rotor housing 209 is turned to a vertical orientation, as indicated by reference arrow 360 in FIG. 9. Then, as indicated by reference arrow 370 in FIG. 10, the fuel-air mixing module is moved (preferably on the feet 204 and track 206 earlier described) into engagement with the inlet side 212 of the main rotor housing 209. When alignment is achieved, then the outlet flange 380 of the fuel-air mixing module 200 is secured to the inlet side 214 of the main rotor housing 209 by way of fasteners 382.

Figure 11:
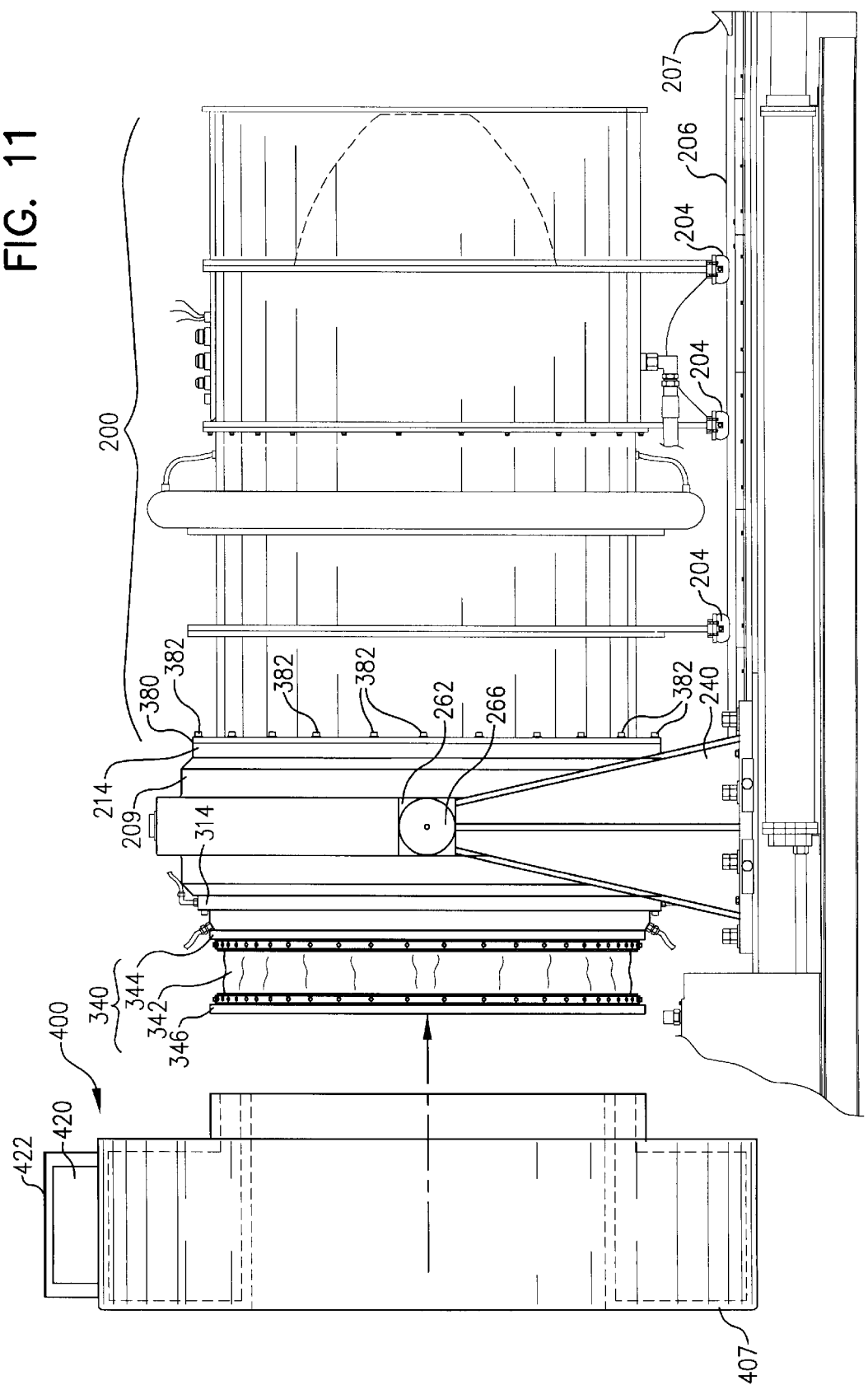
FIG. 11 is a side view of a fourth step in a method of engine assembly, showing the exhaust gas collection assembly being assembled in an operating location, and being secured to the exhaust duct expansion joint.

In FIG. 11, the exhaust gas collection assembly 400 is shown being assembled into an operating location, and sealingly secured to the outlet flange 344 and inner outlet flange 348 of the exhaust gas duct expansion joint 340. As better seen in FIG. 4, the exhaust gas collection assembly includes a first exhaust stand 402 and a second exhaust stand 404 on which a lower portion 406 of the annular exhaust gas collection chamber 407 is mounted. An upper portion 408 of the annular exhaust gas collection chamber 407 is provided for mounting at preferably horizontal first 410 and second 412 flanged joints. For reference, exhaust gases exit the annular exhaust gas collection chamber 407 via exhaust port 420, shown with exit flanges 422 for mounting to the plant combustion gas exhaust system. The finished, attached exhaust gas collection assembly 400 is shown attached at FIG. 12.

Figure 12:
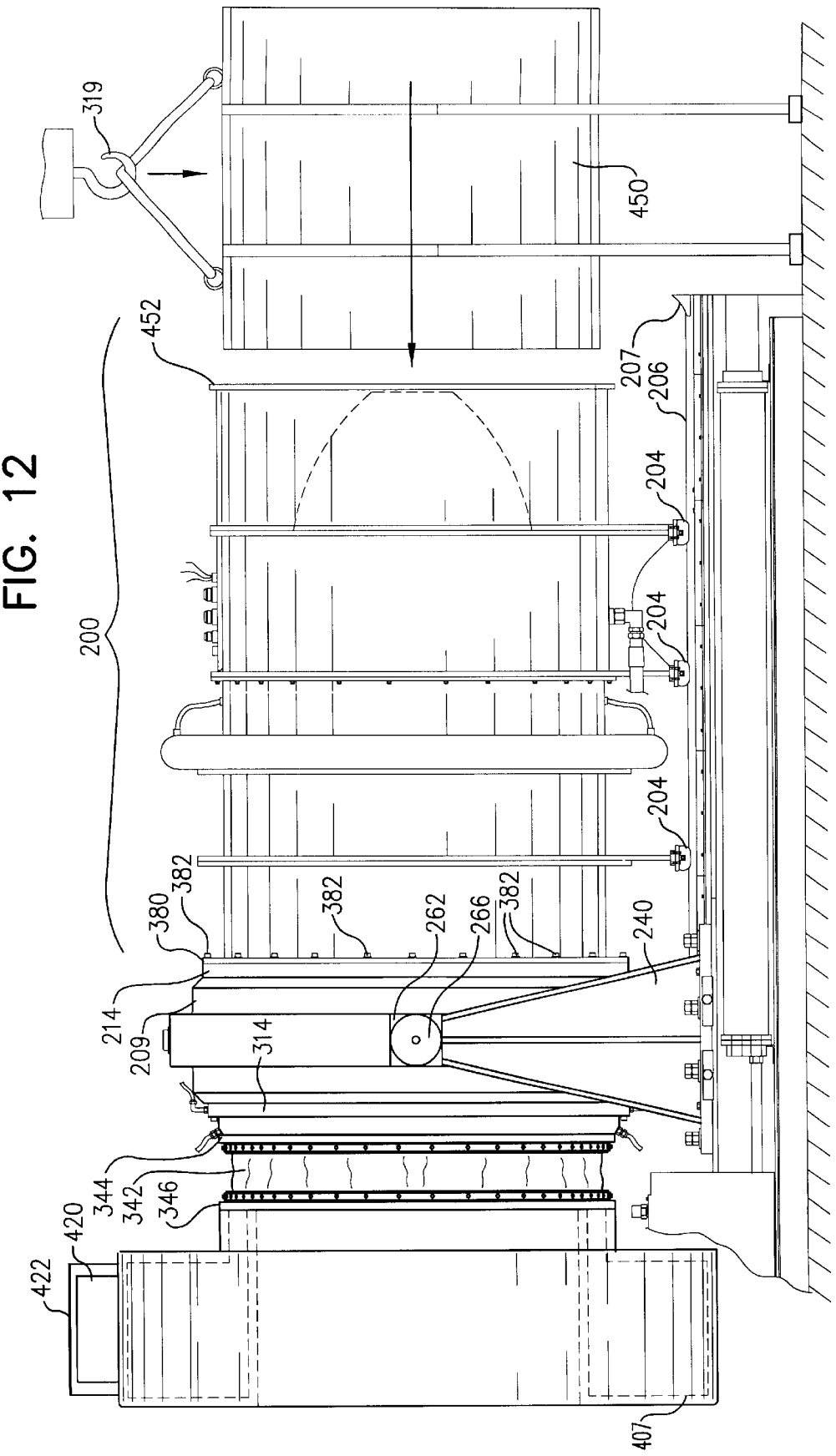
FIG. 12 is a side view of a fifth step in a method of engine assembly, showing the step of installing an inlet air plenum, and also showing the exhaust expansion joint fully connected.

FIG. 12 also illustrates the step of installing the inlet air plenum 450 at the air intake or upstream side 452 of the fuel-air mixing module 200.

Figure 16:
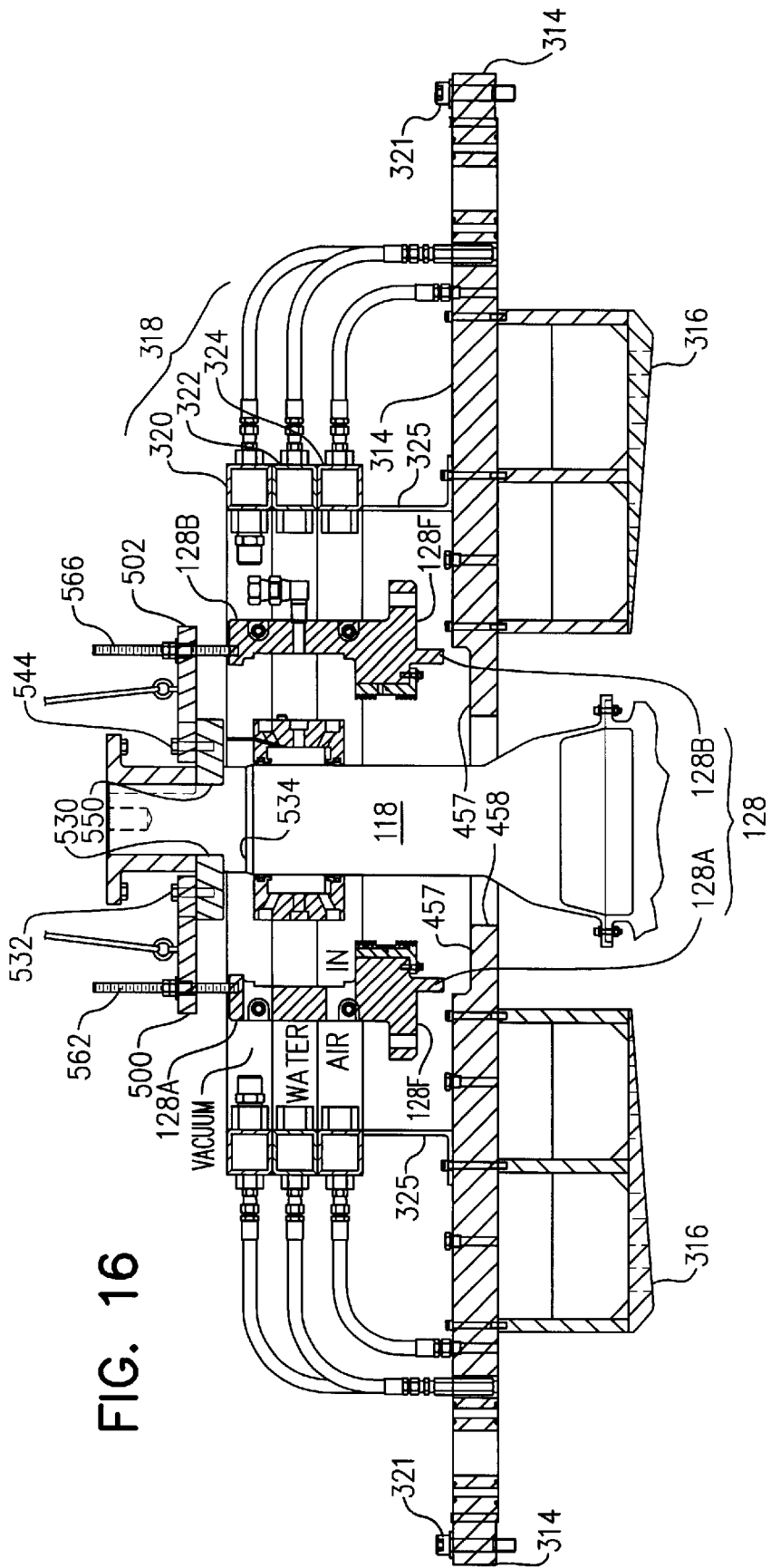
Figure 18:
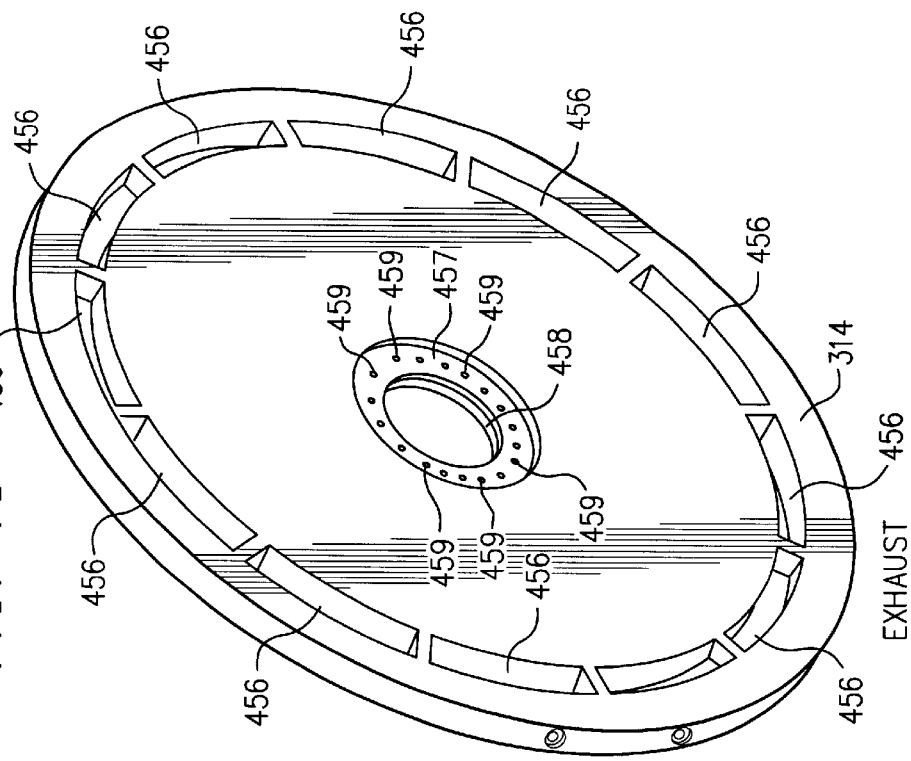
FIG. 18 provides a perspective view of the exhaust bearing plate, showing the mounting flange for locating the outlet bearing housing.
Figure 17:
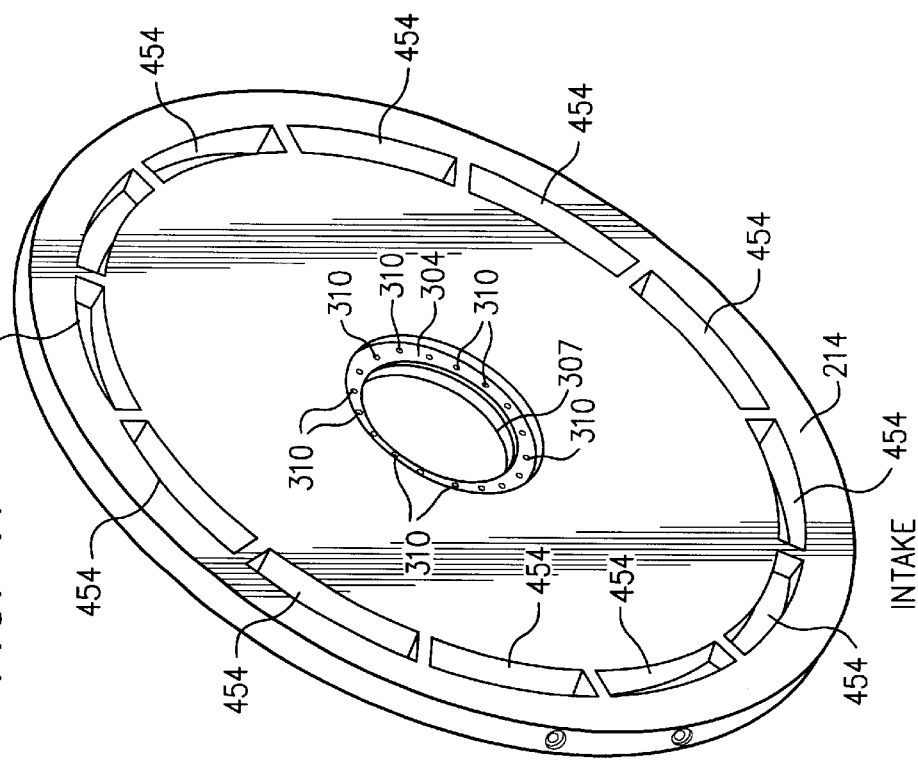
FIG. 17 provides a perspective view of the inlet bearing plate, showing the mounting flange for locating the inlet bearing housing.

The overall configuration of the inlet bearing plate 214 and the outlet bearing plate 314 can be seen in FIGS. 17 and 18. The intake bearing plate 214 is in the basic form of a circular disk, and has been described above with respect to flange 304 and circular central passageway 307. For passage of the fuel-air mixture through the intake bearing plate 214, a plurality of segmented annular passageways 454 are provided. In the exhaust bearing plate 314, is also in the basic form of a circular disc, and similar segmented annular passageways 456 are provided for exit of hot combustion gases. With respect to the mounting of exhaust bearing housing 128, the exhaust bearing flange 128F (see FIG.16) seats on the exhaust bearing plate bearing receiving flange 457. The output shaft 118 extends through central aperture 458 and into the output bearing housing 128. Threads T are provided in receiving apertures 459 in flange 457, for receipt of mounting bolts 580 (described below) to secure bearing housing 128 to exhaust bearing plate 314.

FIGS. 13, 14, 15, and 16 are a series of drawings which show in detail the steps utilized to remove the outlet bearing housing 128 from the outlet bearing plate 314.

Figure 13:
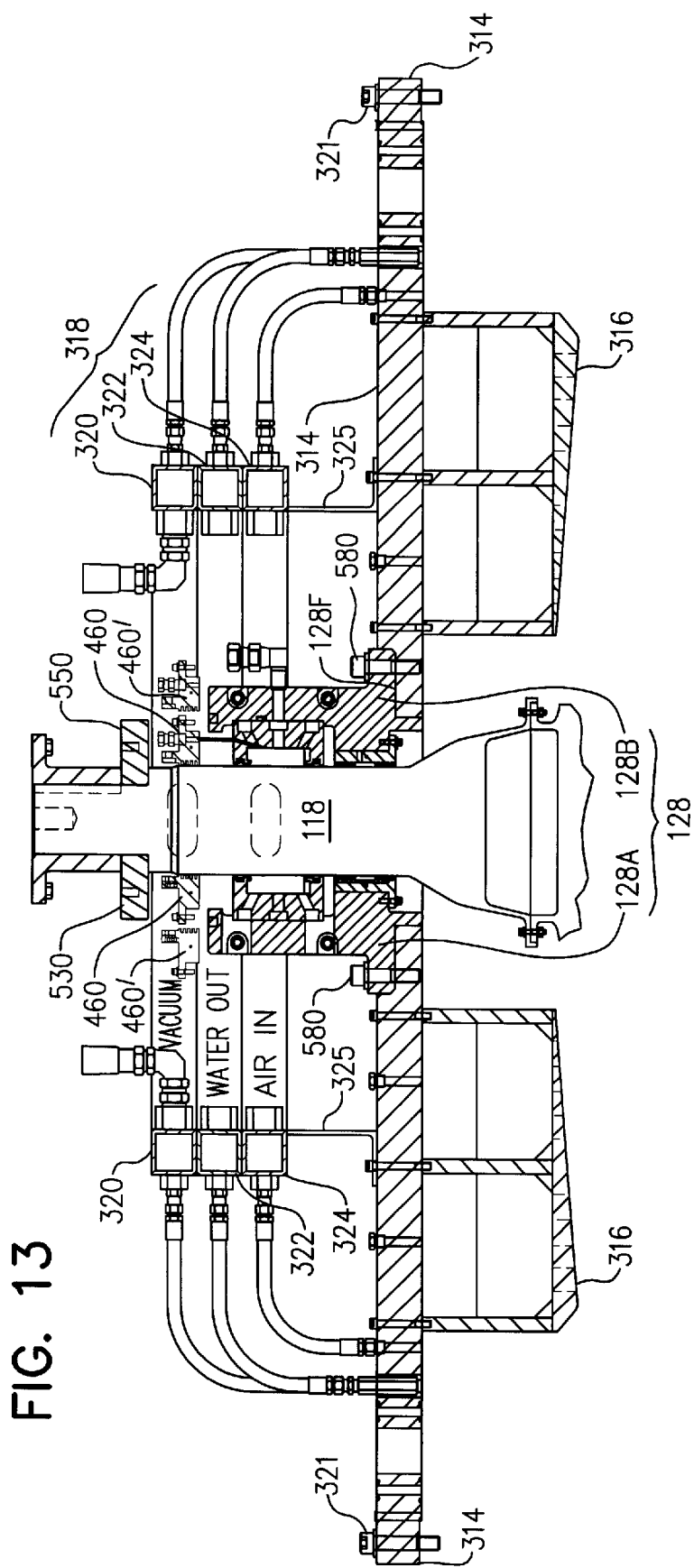
FIGS. 13, 14, 15, and 16 are a series of drawings which show in detail the steps utilized to remove the outlet bearing housing from the outlet bearing plate.

FIG. 13 shows the outlet bearing housing 128 with two external labyrinth seal portions 460 removed vertically, and then also shows the very same labyrinth seal portions with reference numeral 460', after the seal portions have been split apart for extraction from the outlet bearing housing 128.

Figure 14:
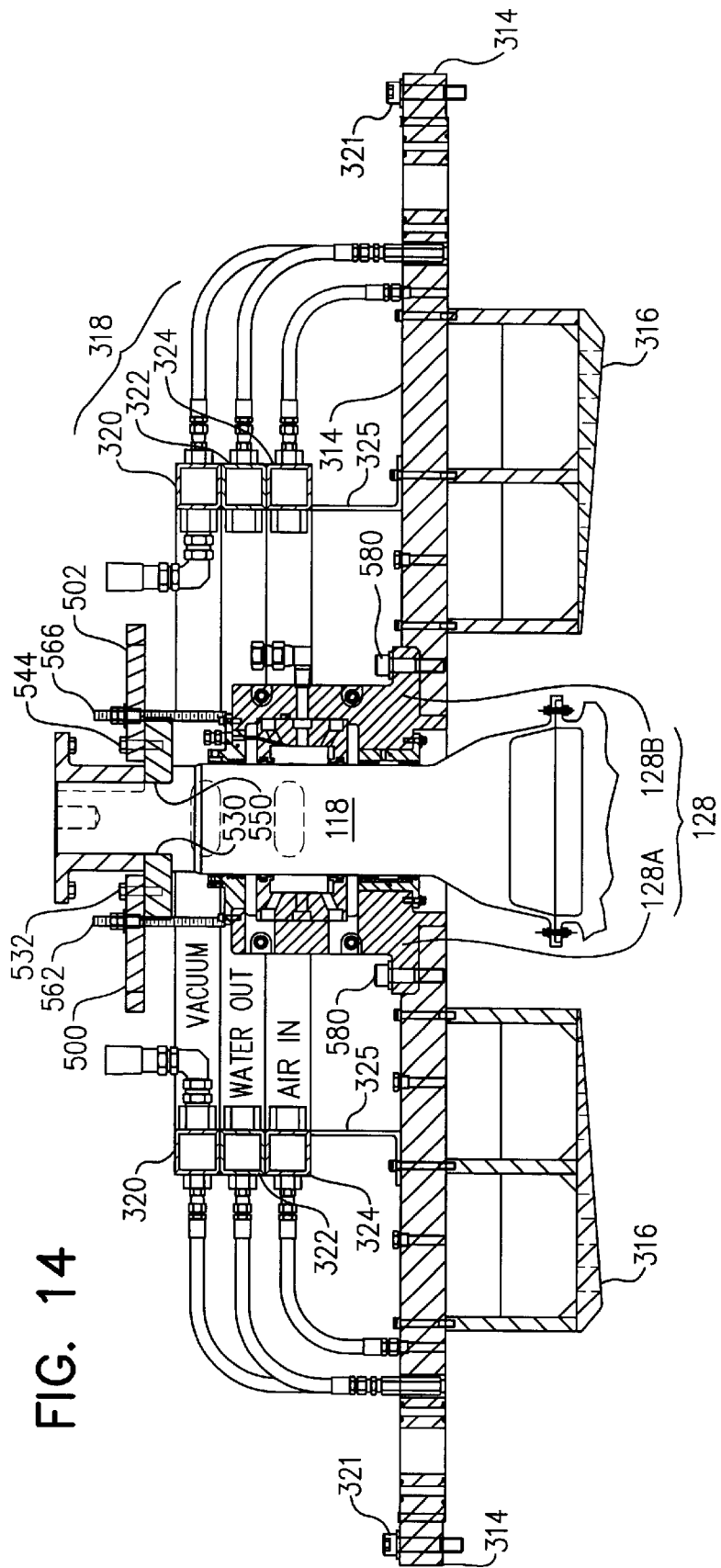

Next, FIG. 14 shows the first 128A and second 128B portions of outlet bearing housing 128 with a pair of lifting plates 500 and 502 being affixed to the first portion 128A and to the second portion 128B of the outlet bearing housing 128, so that the first portion 128A and that the second portion 128B of the outlet bearing housing 128 may be lifted. Temporary lifting plates 500 and 502 are preferably provided in small, stiff, planar form, such as a one inch thick steel plate, with a throat cutout portion 504 and 506, in plates 500 and 502, respectively, which allows close fitting engagement of the first 128A and second 128B bearing housing portions when the throat portions 504 and 506 are inserted adjacent the shaft 124 in close fitting proximity. A pair of spaced apart, outwardly and preferably radially extending, elongated through plate spacer track passageways 510 and 512 are provided in plate 500. Similarly, a pair of spaced apart, outwardly and preferably radially extending passageways 514 and 516 are provided in plate 502. Attachment bolt apertures 520 and 522 are provided in plate 500 for affixing plate 500 via one or more, and preferably two fasteners such as bolts 532 to flange 530 which is attached to the end 534 of shaft 128. Attachment bolt apertures 540 and 542 are provided in plate 502 for affixing plate 502 via one or more, and preferably two fasteners such as bolts 544 to flange 550 which is attached to the end 534 of shaft 128.

A first pair of threaded rods 560 and 562, each with washer W and nut N, are provided for using plate 500 for lifting bearing housing portion 128A. A second pair of threaded rods 564 and 566, each with washer W and nut N, are provided for using plate 502 for lifting bearing housing portion 128B. For removal of the bearing housing portions 128A and 128B, the threaded rods 560, 562, 564, and 566 are securely affixed to the inlet side of the adjacent bearing housing portions 128A or 128B, preferably by using an appropriately sized threaded receiving portion 570 or 570, as can be visualized in FIG. 16, for instance. Also in FIG. 16, it can be seen how the threaded rods 562 and 566 have been employed to urge bearing portions 128A and 128B upward and outward, after removal of the bearing fasteners 580 (see FIGS. 13 or 14, and then compare FIG. 15, where fasteners 580 have been removed).

Figure 19:
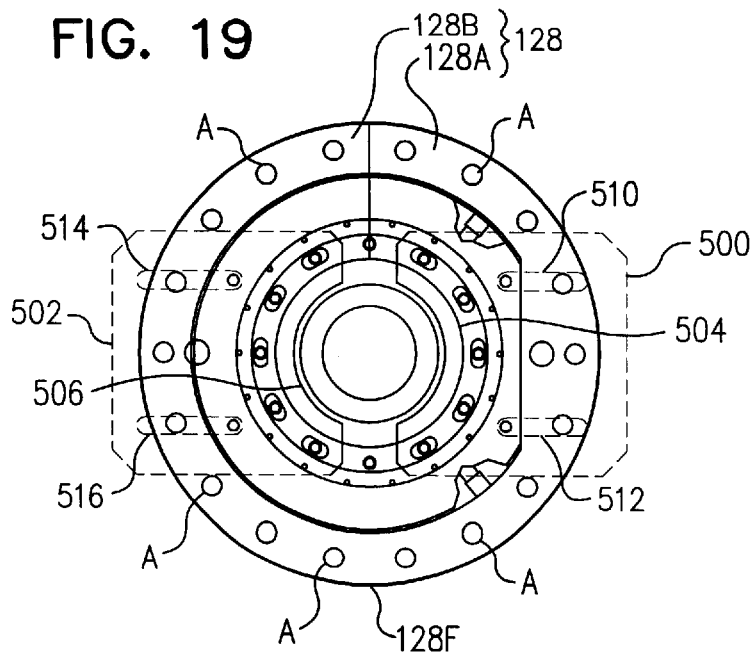
FIG. 19 shows a top view of the outlet bearing housing assembly, and also showing in broken lines the pair of lifting plates described in FIGS. 13 through 16.
Figure 20:
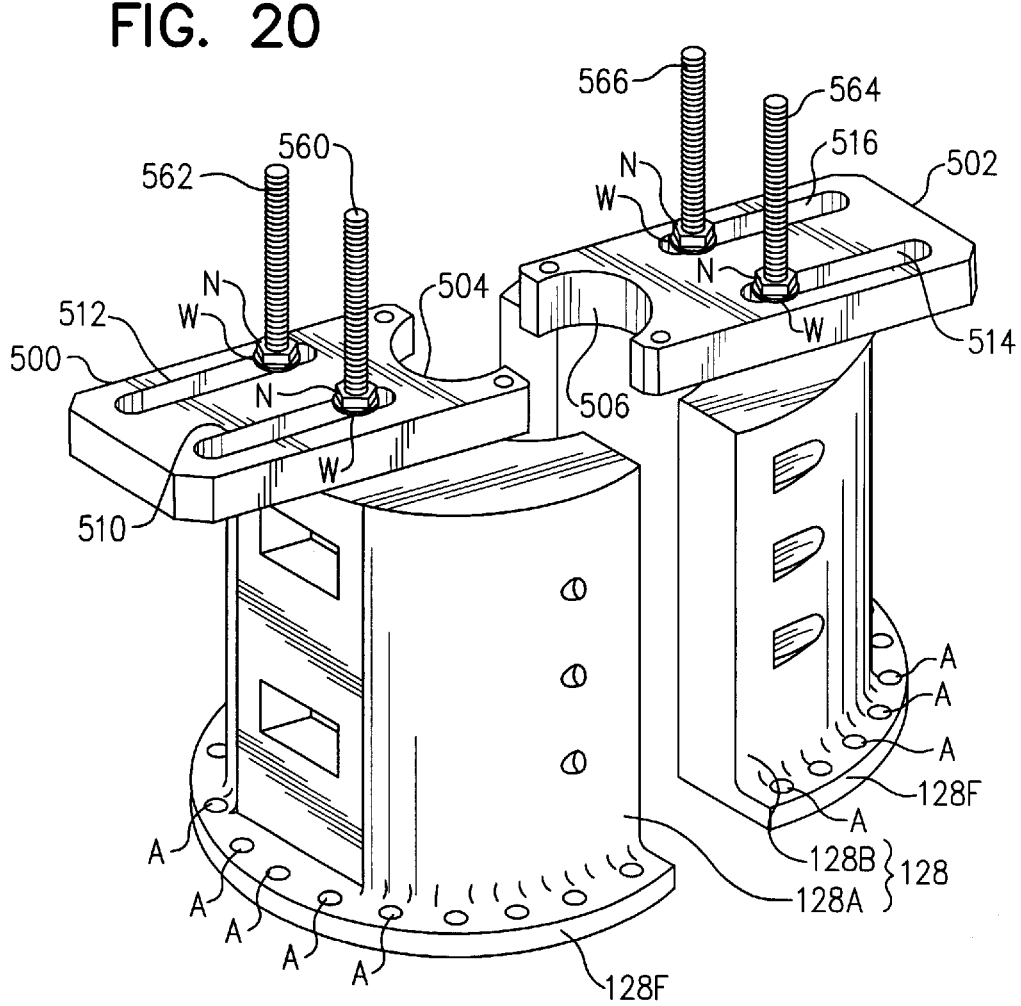
FIG. 20 provides a perspective view of first and second outlet bearing housing portions, with lifting plates secured thereabove, after the first and second bearing housing portions have been removed from the outlet bearing plate.

By comparison of FIGS. 19 and 20, the use of the elongated passageways 500, 510, 514 and 516 can be understood. Specifically, once the bearing housing portions 128A and 128B are raised to an upward, disconnected position, then the bearing housing portions 128A and 128B are spread apart as seen in FIG. 20, leaving only the bearing 600 itself adjacent the shaft 128. Then, by removal of fasteners 532 and 544, etc., lifting lugs 602 and 604 may be utilized with any convenient lifting means to separately remove bearing housing portions 128A and 128B; see FIG. 20 generally, although it must be understood that the threaded rods 560, 562, 564, and 566 have been repositioned radially inward, at least with respect to the plates 500 and 502, for temporary storage of those plates.

Although the method of removal of the outlet bearing housing portions 128A and 128B have just been described in detail, it is to be understood that the installation of the outlet bearing housing portions 128A and 128B may be accomplished in reverse fashion. Likewise, although the installation of the remainder of the components of the ramjet engine have been taught in detail, particularly with respect to FIGS. 7 through 12, it is to be understood that the disassembly process may be accomplished in reverse fashion. Given the detailed teachings herein, the entire process may now be repeated in either direction without particular difficulty or undue experimentation by those of skill in the art and to whom this specification is directed.

Importantly, the novel, modular assembly, disassembly, and inspection method illustrated offers superior advantages in the assembly, disassembly, and in the operation and maintenance of such power plants. The apparatus and method described is an important improvement in providing a compact, easily constructed, cost effective power plant. It will thus be seen that the objects set forth above, including those made apparent from the proceeding description, are efficiently attained. Since certain changes may be made in carrying out the construction of a power generation apparatus and in the execution of the method of assembling, inspecting, and repairing a power generation plant as described herein, while nevertheless achieving desirable results in accord with the principles generally set forth herein, it is to be understood that the invention may be embodied in other specific forms without departing from the spirit or essential characteristics thereof. For example, while there have been exemplary designs set forth for a modular and relocatable air inlet, many other embodiments are also feasible to attain the result of the principles of the apparatus and via use of the methods disclosed herein.

All the features disclosed in this specification (including any accompanying claims and the drawing) and/or any steps in the method or process so disclosed, may be combined in any combination, except combinations where at least some of the features and/or steps are mutually exclusive.

Each feature disclosed in this specification (including in any accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features.

Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed herein. As such, it is intended to cover the structures and methods described therein, and not only the equivalents or structural equivalents thereof, but also equivalent structures or methods. Thus, the scope of the invention is intended to include variations from the embodiments provided which are nevertheless described by the broad meaning and range properly afforded to the language used herein, or to the equivalents thereof.

What is claimed is:

1. A modular engine assembly, comprising:

(a) a ramjet engine combustor housing, said combustor housing being strong, structurally weight bearing, and having a circular inner wall and further comprising opposing pivotable external connectors;

(b) a rotor within said housing, said rotor comprising one or more ramjet combustors and a rotor shaft with a longitudinal axis, and (c) a horizontally oriented external drive shaft, said external drive shaft further comprising a coupling connecting said external drive shaft to said rotor shaft, (d) an engine stand for supporting said combustor housing, said engine stand further comprising (i) a base, and (ii) a generally U-shaped support member extending from said base, said support member oriented transversely to said longitudinal axis and having opposing pivot blocks mounted on opposing sides of said U-shaped support member;

(e) a first pivot pin and a second pivot pin, said first and said second pivot pin (i) each shaped and sized for close interfitting engagement through one of said opposing pivot blocks; and (ii) each shaped and sized for secure pivotable engagement with one of said opposing pivotable external connectors on said combustor housing; and (f) said opposing pivotable external connectors supportive of said combustor housing and said rotor in a freestanding configuration in alternate positions, either (1) wherein said combustor housing is horizontally oriented and said rotor shaft is vertically oriented, or (2) wherein said combustor housing is vertically oriented and said rotor shaft is horizontally oriented; and (g) wherein when said rotor shaft is placed in said horizontal position, said coupling is detachably affixible between said rotor shaft and said horizontal drive shaft, so as to place said ramjet engine in an operational configuration.

2. The modular engine assembly as set forth in claim 1, wherein said U-shaped support member comprises an upwardly opening support member.

3. The modular engine assembly as set forth in claim 1, wherein said opposing pivot blocks are mounted at opposing distal ends of said U-shaped support member.

4. The engine assembly as set forth in claim 3, wherein said inlet side bearing plate comprises a substantially circular perforated disc.

5. The apparatus as set forth in claim 4, further comprising an inlet bearing housing with inlet bearing, said inlet bearing housing securely affixed to said inlet side bearing plate, said inlet bearing adapted for securely positioning a portion of said shaft for rotary motion.

6. The apparatus as set forth in claim 5, wherein said inlet bearing housing is detachably affixable to said inlet bearing plate.

7. The apparatus as set forth in claim 6, wherein said inlet bearing plate has an inlet side and an outlet side with respect to airflow along said longitudinal axis, and wherein said inlet bearing housing is detachably affixed to said inlet bearing plate by fasteners accessible from the inlet side of said inlet bearing plate.

8. The modular engine assembly as set forth in claim 1, wherein said combustor housing comprises an inlet side and an exhaust side, and wherein said engine assembly further comprises an inlet side bearing plate securely affixed to said inlet side of said combustor housing.

9. The apparatus as set forth in claim 8, wherein said inlet bearing housing further comprises a support flange portion, and wherein said inlet bearing plate further comprises a recessed inlet bearing support flange receiving portion complementary in size and shape and adapted to receive said support flange portion.

10. The apparatus as set forth in claim 9, wherein, when said inlet bearing plate is oriented in a horizontal position with the inlet side down, said inlet bearing housing is sized and shaped to extend downward through said inlet bearing plate while supported from said inlet bearing plate by said support flange resting on said support flange receiving portion.

11. The engine assembly as set forth in claim 1, wherein said combustor housing comprises an inlet side and an exhaust side, and wherein said engine assembly further comprises an outlet side bearing plate securely affixed to said outlet side of said combustor housing.

12. The engine assembly as set forth in claim 11, wherein said outlet side bearing plate comprises a substantially circular perforated disc.

13. The apparatus as set forth in claim 12, further comprising an outlet bearing housing and outlet bearing, said outlet bearing housing securely affixed to said outlet side bearing plate, said outlet bearing adapted for securely positioning a portion of said shaft for rotary motion.

14. The apparatus as set forth in claim 13, wherein said outlet bearing housing is comprised of at least two outlet bearing housing portions.

15. The apparatus as set forth in claim 14, wherein said outlet bearing housing is split into opposing portions along the axis of said shaft.

16. The apparatus as set forth in claim 14, further comprising a pair of temporary lifting plates, each of said pair of temporary lifting plates comprising
   (a) a throat section having a shaft shaped cutout, and
   (b) a planar adjustment portion extending outward a preselected distance from said throat section, said planar adjustment portion further comprising
      (a) adjacent said throat section, one or more attachment holes, each of said attachment holes comprising passageways through said planar adjustment portion defined by an interior sidewall;
      (b) extending outward from said throat section, one or more narrow, elongated spacer tracks, each of said spacer tracks comprising outwardly extending opposing sidewall portions through said planar adjustment portion.

17. The apparatus as set forth in claim 16, further comprising an assembly hardware kit, said assembly hardware kit comprising:
   (a) at least one attachment fastener for each of said temporary lifting plates;
   (b) at least one threaded rod for each of said temporary lifting plates;
   (c) a washer for each one of said at least one threaded rods, and
   (d) a complementary sized nut for each one of said at least one threaded rods.

18. The apparatus as set forth in claim 17, wherein each of said output bearing housing portions further comprises an exhaust end, said exhaust end having thereon a threaded receiver sized and shaped to securely receive therein, for lifting of the weight of said output bearing portion, one of said at least one threaded rods.

19. The apparatus as set forth in claim 11, wherein said outlet bearing housing further comprises an outlet bearing support flange portion, and wherein said outlet bearing plate further comprises a recessed outlet bearing support flange receiving portion complementary in size and shape and adapted to receive said outlet bearing support flange portion.

20. The apparatus as set forth in claim 19, wherein when said outlet bearing plate is oriented in a horizontal position with the outlet side up, said outlet bearing housing is sized and shaped to extend upwardly above said outlet bearing plate while supported from said outlet bearing plate by said outlet bearing support flange resting on said outlet bearing support flange receiving portion.

21. The ramjet engine as set forth in claim 1, further comprising a fuel-air mixing module, said fuel-air mixing module comprising
   (a) a fuel inlet;
   (b) an air inlet;
   (c) an outlet for supply of a fuel-air mixture to said one or more ramjet combustors;
   (d) two or more pairs of transversely spaced apart feet, said feet adapted for low friction linear displacement along said longitudinal axis.

22. The apparatus as set forth in claim 21, further comprising a foundation and a pair of transversely spaced apart rails mounted on said foundation, said rails adapted to receive said feet of said fuel-air mixing module so as to provide a track for low friction linear displacement of said fuel-air mixing module therealong.

23. The apparatus as set forth in claim 22, wherein said track comprises a pair of transversely spaced apart cylindrical shafts.

24. The apparatus as set forth in claim 22, wherein said track has a proximal end adjacent said engine stand, and a distal end horizontally spaced apart therefrom a pre-selected distance sufficient for enabling said combustor housing to be rotated to a horizontal position when said fuel-air mixing module is backed away from said combustor housing.

25. The apparatus as set forth in claim 24, wherein said track further comprises one or more end stops, said one or more end stops located at or near said distal end of said track.

26. The apparatus as set forth in claim 22, wherein said track is substantially horizontal and parallel to said longitudinal axis.

27. The apparatus as set forth in claim 21, wherein said fuel-air mixing apparatus comprises three pairs of transversely spaced apart feet.

28. The apparatus as set forth in claim 21, wherein each of said feet comprises an opposing, dual type linear roller guide.

29. The apparatus as set forth in claim 28, wherein each of said dual type linear roller guides comprise self centering type radiused rollers.

30. The apparatus as set forth in claim 29, wherein each of said cylindrical shafts is supported by and is nested in a base rail portion.

31. A method of assembly for a modular ramjet power plant, comprising:
   (a) providing a strong, structurally weight bearing ramjet engine combustor housing with opposing pivotable external connectors and a rotor with said housing, said rotor comprising one or more ramjet combustors and a rotor shaft with a longitudinal axis;
   (b) providing an engine stand for supporting said ramjet engine combustor housing, said engine stand further comprising
      (i) a base,
      (ii) a generally U-shaped support member extending from said base, said support member oriented transversely to said longitudinal axis and having opposing pivot blocks mounted on opposing sides of said U-shaped support members;

(c) pivotally mounting said ramjet engine combustor housing on said engine stand, using a first pivot pin and a second pivot pin, said first and said second pivot pin
 (i) each shaped and sized for close interfitting engagement through one of said opposing pivot blocks, and
 (ii) each shaped and sized for secure pivotable engagement with one of said opposing pivotable external connectors on said combustor housing;

(d) providing a horizontally oriented external drive shaft, said external drive shaft further comprising a coupling connecting said external drive shaft to said rotor shaft;

(e) wherein said opposing pivotable external connectors are supportive of said combustor housing and said rotor in a freestanding configuration in alternate positions, either (1) wherein said combustor housing is horizontally oriented and said rotor shaft is vertically oriented, or (2) wherein said combustor housing is vertically oriented and said rotor shaft is horizontally oriented; and (f) wherein when said rotor shaft is placed in a horizontal position, said coupling is detachably affixable between the rotor shaft and said horizontal drive shaft, so as to place said ramjet engine in an operational configuration.

32. The method as set forth in claim 31, wherein said combustor housing has an inlet side and an exhaust side, further comprising the step of pivoting said combustor housing to a horizontal position wherein said inlet side is upward.

33. The method as set forth in claim 32, further comprising the steps of
 (a) providing an inlet bearing plate, and
 (b) mounting said inlet bearing plate to said inlet side of said combustor housing.

34. The method as set forth in claim 33, further comprising the step of rotating said combustor housing and said inlet bearing plate 180 degrees, so that said outlet side of said combustor housing is in a substantially horizontal position with said outlet side upward.

35. The method as set forth in claim 33, further comprising the steps of
 (a) providing a rotor assembly having
  (i) one or more ramjet combustors,
  (ii) a shaft with a longitudinal axis, and
  (iii) an inlet bearing housing;
 (b) lowering said rotor assembly into said combustor housing;
 (c) securing said inlet bearing housing to said inlet bearing plate.

36. The method as set forth in claim 35, further comprising the steps of
 (a) providing an outlet bearing plate, and
 (b) securing said outlet bearing plate on said outlet side of said combustor housing.

37. The method as set forth in claim 36, further comprising the steps of
 (a) providing an outlet bearing housing, and
 (b) securing said outlet bearing housing to said outlet bearing plate.

38. The method as set forth in claim 37, further comprising the step of rotating said combustor housing to a vertical position, wherein said inlet side and said outlet side are properly positioned with respect to said longitudinal axis.

39. The method as set forth in claim 38, further comprising the step of securing said combustor housing in said vertical position by inserting an alignment pin in the lower reaches of said combustor housing.

40. The method as set forth in claim 39, further comprising
 (a) providing a fuel-air mixing module,
 (b) moving said fuel-air mixing module to an operating position adjacent said combustor housing, and
 (c) affixing said fuel-air mixing module to said inlet side of said combustor housing.

41. The method as set forth in claim 40, wherein the step of moving said fuel-air mixing module to said operating position includes the step of rolling said fuel-air mixing module on a track toward said combustor housing.

42. The method as set forth in claim 40, further comprising
 (a) providing an exhaust gas collection assembly, and
 (b) affixing said exhaust gas collection assembly in an operating position adjacent said outlet side of said combustor housing, so that hot exhaust gases are contained within said exhaust gas collection assembly for routing to an exhaust gas discharge location.

43. The method as set forth in claim 42, further comprising
 (a) providing an electrical generator, and
 (b) coupling said shaft on said rotor with said electrical generator.

44. The method as set forth in claim 43, further comprising operatively coupling a gearbox between said shaft on said rotor and said electrical generator.

* * * * *